(12) United States Patent
Chen et al.

(10) Patent No.: US 11,363,253 B2
(45) Date of Patent: Jun. 14, 2022

(54) SYSTEMS AND METHODS FOR GENERALIZED MULTI-HYPOTHESIS PREDICTION FOR VIDEO CODING

(71) Applicant: VID SCALE, INC, Wilmington, DE (US)

(72) Inventors: Chun-Chi Chen, Hsinchu (TW); Xiaoyu Xiu, San Diego, CA (US); Yuwen He, San Diego, CA (US); Yan Ye, San Diego, CA (US)

(73) Assignee: Vid Scale, Inc., Wilmington, DE (US)

( * ) Notice: Subject to any disclaimer, the term of this patent is extended or adjusted under 35 U.S.C. 154(b) by 0 days.

(21) Appl. No.: 16/099,392

(22) PCT Filed: May 11, 2017

(86) PCT No.: PCT/US2017/032208
§ 371 (c)(1),
(2) Date: Nov. 6, 2018

(87) PCT Pub. No.: WO2017/197146
PCT Pub. Date: Nov. 16, 2017

(65) Prior Publication Data
US 2019/0230350 A1    Jul. 25, 2019

Related U.S. Application Data

(60) Provisional application No. 62/415,187, filed on Oct. 31, 2016, provisional application No. 62/399,234, (Continued)

(51) Int. Cl.
*H04N 19/105*    (2014.01)
*H04N 19/139*    (2014.01)
(Continued)

(52) U.S. Cl.
CPC ......... *H04N 19/105* (2014.11); *H04N 19/139* (2014.11); *H04N 19/176* (2014.11);
(Continued)

(58) Field of Classification Search
USPC .................................................... 375/240.02
See application file for complete search history.

(56) References Cited

U.S. PATENT DOCUMENTS 5,832,124 A * 11/1998 Sato ...................... H04N 19/30
382/238
10,805,631 B2    10/2020 Lee
(Continued)

FOREIGN PATENT DOCUMENTS

CN    101176350 A    5/2008
CN    101695114 A    4/2010
(Continued)

OTHER PUBLICATIONS

ITU-T H.264 (Mar. 2010).*
(Continued)

*Primary Examiner* — Patricia I Young
(74) *Attorney, Agent, or Firm* — Invention Mine LLC

(57) ABSTRACT

Systems and methods are described for video coding using generalized bi-prediction. In an exemplary embodiment, to code a current block of a video in a bitstream, a first reference block is selected from a first reference picture and a second reference block is selected from a second reference picture. Each reference block is associated with a weight, where the weight may be an arbitrary weight ranging, e.g., between 0 and 1. The current block is predicted using a weighted sum of the reference blocks. The weights may be selected from among a plurality of candidate weights. Candidate weights may be signaled in the bitstream or may be derived implicitly based on a template. Candidate weights may be pruned to avoid out-of-range or substantially duplicate candidate weights. Generalized bi-prediction may additionally be used in frame rate up conversion.

20 Claims, 16 Drawing Sheets

Related U.S. Application Data filed on Sep. 23, 2016, provisional application No. 62/342,772, filed on May 27, 2016, provisional application No. 62/336,227, filed on May 13, 2016.

(51) Int. Cl.

| | | |
|---|---|---|
| *H04N 19/176* | (2014.01) | |
| *H04N 19/463* | (2014.01) | |
| *H04N 19/96* | (2014.01) | |
| *H04N 19/577* | (2014.01) | |
| *H04N 19/70* | (2014.01) | |
| *H04N 19/573* | (2014.01) | |

(52) U.S. Cl.
CPC ......... *H04N 19/463* (2014.11); *H04N 19/573* (2014.11); *H04N 19/96* (2014.11); *H04N 19/577* (2014.11); *H04N 19/70* (2014.11)

(56) References Cited

U.S. PATENT DOCUMENTS

| | | | |
|---|---|---|---|
| 2004/0008782 A1 | 1/2004 | Boyce et al. | |
| 2004/0008786 A1 | 1/2004 | Boyce | |
| 2006/0268166 A1* | 11/2006 | Bossen | H04N 19/577 348/390.1 |
| 2011/0007803 A1* | 1/2011 | Karczewicz | H04N 19/51 375/240.15 |
| 2013/0259122 A1 | 10/2013 | Sugio | |
| 2014/0153647 A1* | 6/2014 | Nakamura | H04N 19/52 375/240.14 |
| 2014/0362922 A1 | 12/2014 | Puri | |
| 2015/0319441 A1* | 11/2015 | Puri | H04N 19/14 375/240.02 |
| 2016/0029035 A1* | 1/2016 | Nguyen | H04N 19/44 375/240.12 |
| 2018/0249171 A1* | 8/2018 | Lim | H04N 19/51 |
| 2019/0230350 A1* | 7/2019 | Chen | H04N 19/573 |

FOREIGN PATENT DOCUMENTS

| | | |
|---|---|---|
| CN | 101902645 A | 12/2010 |
| CN | 105453570 A | 3/2016 |
| EP | 2763414 | 8/2014 |
| JP | 2005533466 A | 11/2005 |
| JP | 2008541502 A | 11/2008 |
| KR | 20050021487 A | 3/2005 |
| WO | 2004008761 | 1/2004 |
| WO | 2004008761 A1 | 1/2004 |
| WO | 2014039802 A2 | 3/2014 |
| WO | 2017197146 | 11/2017 |

OTHER PUBLICATIONS

International Telecommunication Union, "Affine Transform Prediction for Next Generation Video Coding". Huawei Technologies Co., Ltd., Telecommunication Standardization Sector, Itu-T SG16/Q6 Doc. COM16-C1016, Sep. 2015, pp. 1-11.
Liu, H., et. al., "Local Illumination Compensation". Qualcomm Incorporated, Video Coding Experts Group (VCEG), Telecommunications Standardization Sector ITU-T SG16/Q6, Doc. VCEG-AZ06, Jun. 2015, 4 pages.
Invitation to Pay Additional Fees, and Where Applicable, Protest Fee For PCT/US2017/032208 dated Aug. 14, 2017, 13 Pages.
International Search Report and Written Opinion of the International Searching Authority, for PCT/US2017/032208 dated Oct. 12, 2017, 19 pages.
SMPTE 421M, "VC-1 Compressed Video Bitstream Format and Decoding Process". SMPTE Standard, Apr. 2006, 493 pages.
Sullivan, G. J., et. al., "Overview of the High Efficiency Video Coding (HEVC) Standard". IEEE Transaction on Circuits and Systems for Video Technology, vol. 22, No. 12, Dec. 2012, pp. 1649-1668.
Alshina, E., et. al., "Known Tools Performance Investigation for Next Generation Video Coding". Samsung Electronics, Video Coding Experts Group (VCEG), Telecommunications Standardization Sector ITU-T SG16/Q6, Doc. VCEG-AZ05, Jun. 2015, 7 pages.
Wikipedia "Exponential-Golomb Coding". Wikipedia article modified on Jan. 30, 2016, available at: https://en.wikipedia.org/w/index.php?title=Exponential-Golomb_coding&oldid=702406490, 2 pages.
International Preliminary Report on Patentability for PCT/US2017/032208 dated Nov. 13, 2018.
International Search Report and Written Opinion of the International Searching Authority for PCT/US2019/014691 dated May 15, 2019, 13 pages.
International Telecommunication Union, "Advanced Video Coding for Generic Audiovisual Services". Series H: Audiovisual and Multimedia System; Infrastructure of audiovisual services, Coding of moving video, ITU-T Recommendation H.264, ISO/IEC/MPEG 4 Part 10, Nov. 2007, 564 pages.
Liu, H., et. al., "Local Illumination Compensation". Qualcomm Incorporated, Video Coding Experts Group (VCEG), Telecommunications Standardization Sector ITU-T SG16/Q6, Doc. VCEG-AZ06, Power Point Presentation, Jun. 2015, 7 pages.
Alshina, E., et. al., "Known Tools Performance Investigation for Next Generation Video Coding". Samsung Electronics, Video Coding Experts Group (VCEG), Telecommunications Standardization Sector ITU-T SG16/Q6, Doc. VCEG-AZ05, Power Point Presentation, Jun. 2015, 9 pages.
Chen, C.-C., et. al., "Generalized Bi-Prediction for Inter Coding". InterDigital Communications, Inc., Joint Video Exploration Team (JVET), ITU-T SG 16 WP 3 and ISO/IEC JTC 1/SC 29/WG 11, Doc. JVET-C0047, May 2016, 4 pages.
Chen, C.-C., et. al., "Generalized Bi-Prediction for Inter Coding". InterDigital Communications, Inc., Joint Video Exploration Team (JVET), ITU-T SG 16 WP 3 and ISO/IEC JTC 1/SC 29/WG 11, Doc. JVET-C0047, Power Point Presentation, May 2016, 8 pages.
Suehring, K., et. al., "JVET Common Test Conditions and Software Reference Configurations". Joint Video Exploration Team (JVET), ITU-T SG16 WP3 and ISO/IEC JTC1/SC29/WG11, Doc. JVET-B1010, Feb. 2016.
Bross, B., et. al., "High Efficiency Video Coding (HEVC) Text Specification Draft 10 (for FDIS and Last Call)". Joint Collaborative Team on Video Coding (JCT-VC), Document No. JCTVC-L1003. Jan. 2013, 315 pages.
Chen, J., et. al., "Coding Tools Investigation for Next Generation Video Coding". Qualcomm Incorporated, Telecommunication Standardization Sector ITU-T SG16/Q6, Doc. COM16-C806, Jan. 2015.
An, J., et. al., "Block Partitioning Structure for Next Generation Video Coding". MediaTek Inc., Telecommunication Standardization Sector ITU-T SG16/Q6, Doc. COM16-C966, Sep. 2015, 8 pages.
He, Y., et. al., "CE4-related: Encoder Speed Up and Bug Fix for Generalized Bi-Prediction in BMS-2.1". The Joint Video Exploration Team (JVET) Meeting, Oct. 3-12, 2018, pp. 1-5.
International Preliminary Report on Patentability for PCT/US2019/014691 dated Jul. 28, 2020, 9 pages.
Kamikura, Kazuto, et. al., "Global Brightness-Variation Compensation for Video Coding". IEEE Transactions on Circuits and Systems for Video Technology, vol. 8, No. 8, Dec. 1998, pp. 988-1000.
International Telecommunication Union, "High Efficiency Video Coding". Series H: Audiovisual and Multimedia Systems; Infrastructure of Audiovisual Services—Coding of Moving Video, Recommendation ITU-T H.265, Telecommunication Standardization Sector of ITU, Apr. 2015, 9 pages.

* cited by examiner

SYSTEMS AND METHODS FOR GENERALIZED MULTI-HYPOTHESIS PREDICTION FOR VIDEO CODING

CROSS-REFERENCE TO RELATED APPLICATIONS

The present application is a national stage application under 35 U.S.C. 371 of International Application No. PCT/US2017/032208, entitled "SYSTEMS AND METHODS FOR GENERALIZED MULTI-HYPOTHESIS PREDICTION FOR VIDEO CODING", field on May 11, 2017, which claims benefit under 35 U.S.C. § 119(e) from the following U.S. Provisional Patent Application Ser. No. 62/336,227, filed May 13, 2016, entitled "SYSTEMS AND METHODS FOR GENERALIZED MULTI-HYPOTHESIS PREDICTION FOR VIDEO CODING"; Ser. No. 62/342,772, filed May 27, 2016, entitled "SYSTEMS AND METHODS FOR GENERALIZED MULTI-HYPOTHESIS PREDICTION FOR VIDEO CODING"; Ser. No. 62/399,234, filed Sep. 23, 2016, entitled "SYSTEMS AND METHODS FOR GENERALIZED MULTI-HYPOTHESIS PREDICTION FOR VIDEO CODING"; and Ser. No. 62/415,187, filed Oct. 31, 2016, entitled "SYSTEMS AND METHODS FOR GENERALIZED MULTI-HYPOTHESIS PREDICTION FOR VIDEO CODING," all of which are incorporated herein by reference in their entirety.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG-1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6/VCEG and ISO/IEC/MPEG.

Video encoded using block-based coding accounts for a substantial proportion of data transmitted electronically, e.g. over the internet. It is desirable to increase the efficiency of video compression so that high-quality video content can be stored and transmitted using fewer bits.

SUMMARY

In exemplary embodiments, systems and methods are described for performing generalized bi-prediction (GBi). Exemplary methods include encoding and decoding (collectively "coding") video comprising a plurality of pictures including a current picture, a first reference picture, and a second reference picture, where each picture comprises a plurality of blocks. In an exemplary method, for at least a current block in the current picture a block-level index is coded identifying a first weight and a second weight from among a set of weights, wherein at least one of the weights in the set of weights has a value not equal to 0, 0.5 or 1. The current block is predicted as a weighted sum of a first reference block in the first reference picture and a second reference block in the second reference picture, wherein the first reference block is weighted by the first weight and the second block is weighted by the second weight.

In some embodiments (or for some blocks), block-level information identifying the first and second weights may be coded for the current block by means other than coding an index for that block. For example, a block may be coded in merge mode. In such a case, the block-level information may be information that identifies a candidate block from a plurality of merge candidate blocks. The first and second weights may then be identified based on weights used to code the identified candidate block.

In some embodiments, the first and second reference blocks are further scaled by at least one scaling factor signaled in the bitstream for the current picture.

In some embodiments, the set of weights is coded in the bitstream, allowing different weight sets to be adapted for use in different slices, pictures, or sequences. In other embodiments, the set of weights is predetermined. In some embodiments, only one of the two weights is signaled in the bitstream, and the other weight is derived by subtracting the signaled weight from one.

In some embodiments, codewords are assigned to respective weights, and weights are identified using the corresponding codeword. The assignment of codewords to weights may be a predetermined assignment, or the assignment may be adapted based on weights used in previously-coded blocks.

Exemplary encoders and decoders for performing generalized bi-prediction are also described herein.

Systems and methods described herein provide novel techniques for prediction of blocks of sample values. Such techniques can be used by both encoders and decoders. Prediction of a block results in a block of sample values that, in an encoding method, can be subtracted from an original input block to determine a residual that is encoded in the bitstream. In a decoding method, a residual can be decoded from the bitstream and added to the predicted block to obtain a reconstructed block that is identical to or approximates the original input block. Prediction methods as described herein thus improve the operation of video encoders and decoders by decreasing, in at least some implementations, the number of bits required to encode and decode video. Further benefits of exemplary prediction methods to the operation of video encoders and decoders are provided in the Detailed Description.

BRIEF DESCRIPTION OF THE DRAWINGS

A more detailed understanding may be had from the following description, presented by way of example in conjunction with the accompanying drawings, which are first briefly described below.

DETAILED DESCRIPTION

Block-Based Encoding.

Figure 1:
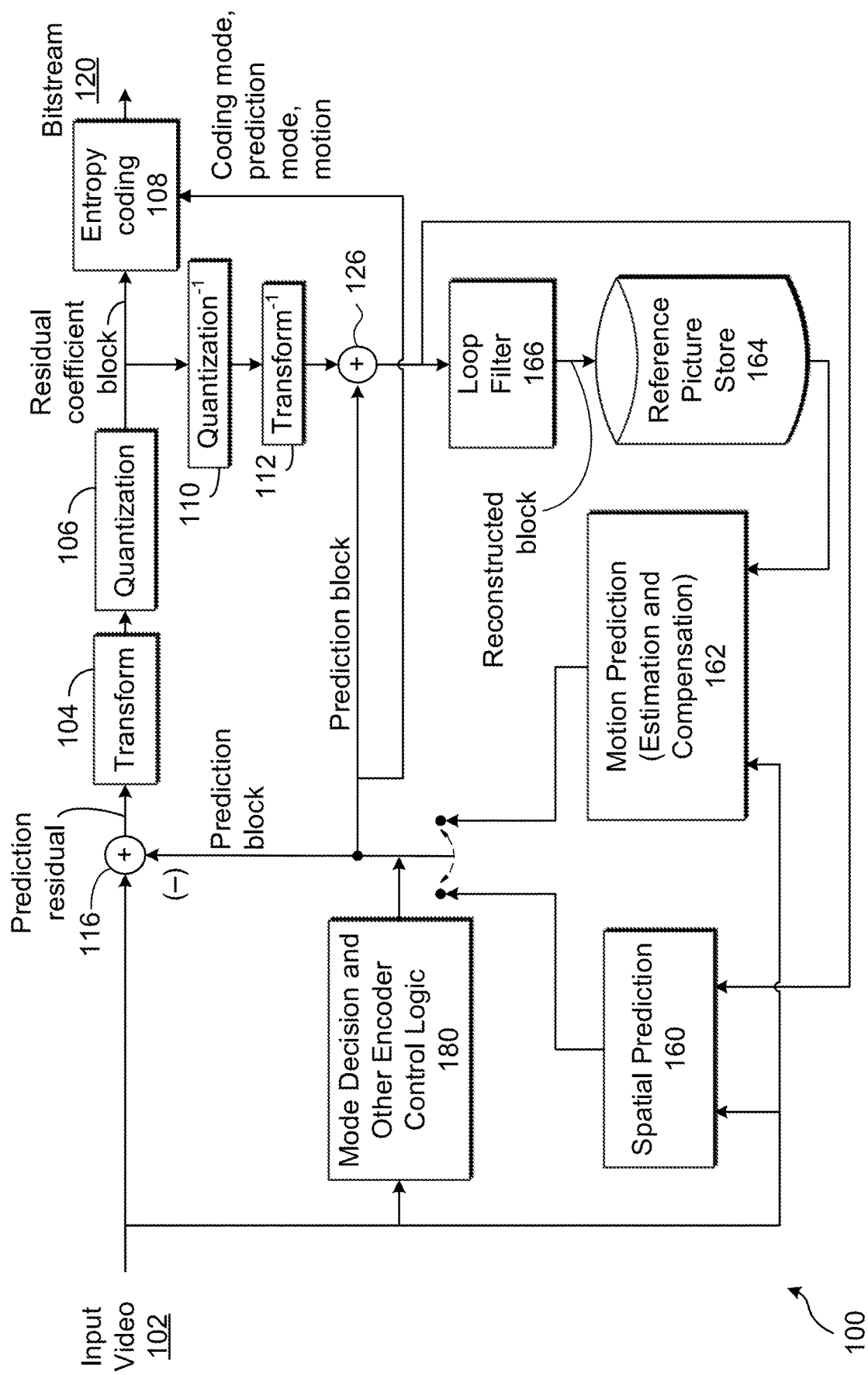
FIG. 1 is a functional block diagram illustrating an example of a block-based video encoder.

FIG. 1 is a block diagram of a generic block-based hybrid video encoding system 100. The input video signal 102 is processed block by block. In HEVC, extended block sizes (called a "coding unit" or CU) are used to efficiently compress high resolution (1080p and beyond) video signals. In HEVC, a CU can be up to 64×64 pixels. A CU can be further partitioned into prediction units or PU, for which separate prediction methods are applied. For each input video block (MB or CU), spatial prediction (160) and/or temporal prediction (162) may be performed. Spatial prediction (or "intra prediction") uses pixels from the already coded neighboring blocks in the same video picture/slice to predict the current video block. Spatial prediction reduces spatial redundancy inherent in the video signal. Temporal prediction (also referred to as "inter prediction" or "motion compensated prediction") uses pixels from the already coded video pictures to predict the current video block. Temporal prediction reduces temporal redundancy inherent in the video signal. A temporal prediction signal for a given video block may be signaled by one or more motion vectors which indicate the amount and the direction of motion between the current block and its reference block. Also, if multiple reference pictures are supported (as is the case for the recent video coding standards such as H.264/AVC or HEVC), then for each video block, a reference index of the reference picture may also be sent. The reference index is used to identify from which reference picture in the reference picture store (164) the temporal prediction signal comes. After spatial and/or temporal prediction, the mode decision block (180) in the encoder chooses the best prediction mode, for example based on the rate-distortion optimization method. The prediction block is then subtracted from the current video block (116); and the prediction residual is de-correlated using transform (104) and quantized (106) to achieve the target bit-rate. The quantized residual coefficients are inverse quantized (110) and inverse transformed (112) to form the reconstructed residual, which is then added back to the prediction block (126) to form the reconstructed video block. Further in-loop filtering such as de-blocking filter and Adaptive Loop Filters may be applied (166) on the reconstructed video block before it is put in the reference picture store (164) and used to code future video blocks. To form the output video bit-stream 120, coding mode (inter or intra), prediction mode information, motion information, and quantized residual coefficients are all sent to the entropy coding unit (108) to be further compressed and packed to form the bit-stream.

Block-Based Decoding.

Figure 2:
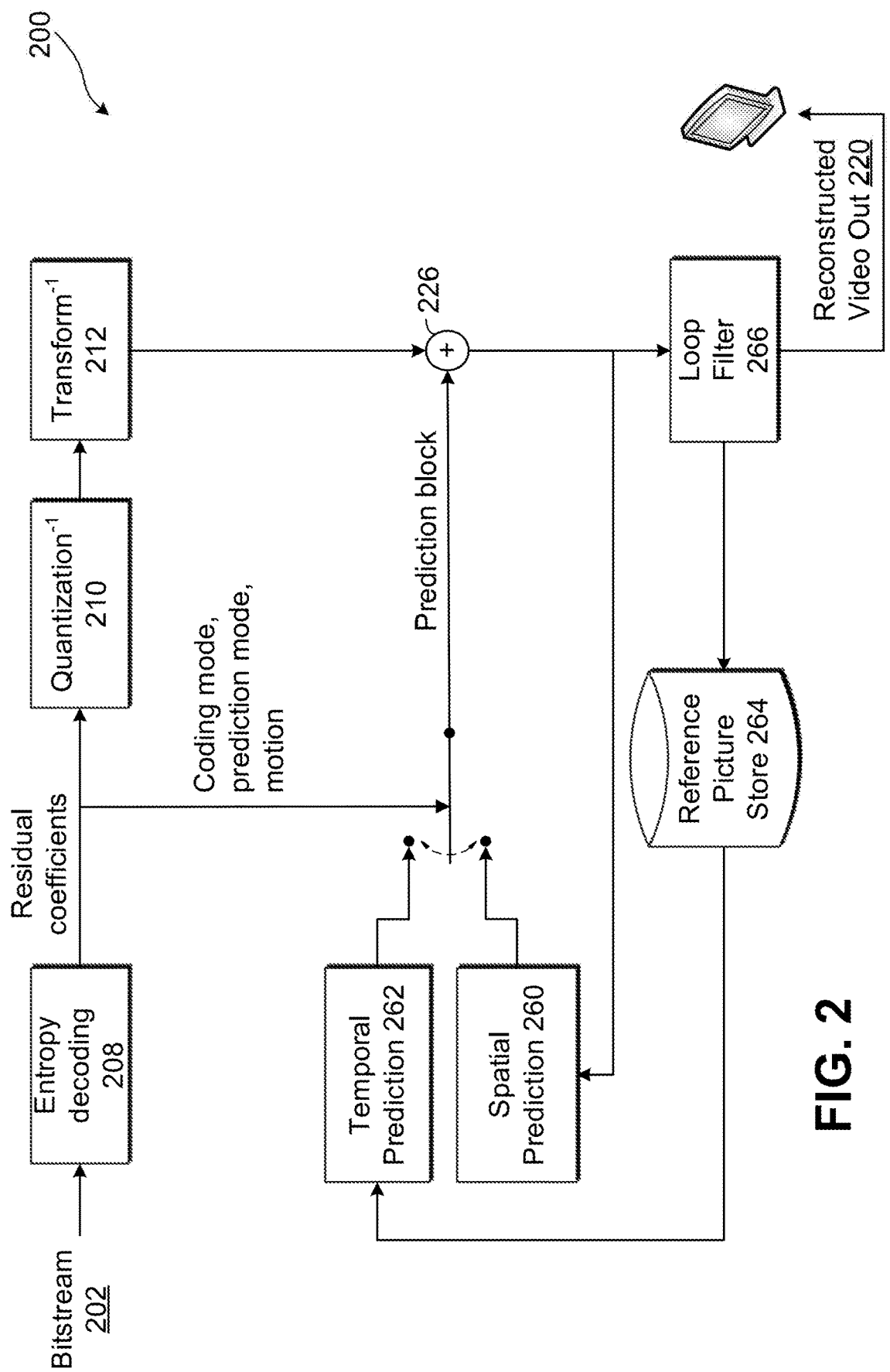
FIG. 2 is a functional block diagram illustrating an example of a block-based video decoder.

FIG. 2 gives a general block diagram of a block-based video decoder 200. The video bit-stream 202 is unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering before it is stored in reference picture store 264. The reconstructed video in reference picture store is then sent out to drive a display device, as well as used to predict future video blocks.

In modern video codecs, bi-directional motion compensated prediction (MCP) is known for its high efficiency in removing temporal redundancy by exploiting temporal correlations between pictures, and has been widely adopted in most of the state-of-the-art video codecs. However, the bi-prediction signal is formed simply by combining two uni-prediction signals using a weight value equal to 0.5. This is not necessarily optimal to combine the uni-prediction signals, especially in some condition that illuminance changes rapidly in from one reference picture to another. Thus, several prediction techniques have been developed aiming at compensating the illuminance variation over time by applying some global or local weights and offset values to each of the sample values in reference pictures.

Weighted Bi-Prediction.

Weighted bi-prediction is a coding tool used primarily for compensating illuminance changes over time, such as fading transitions, when performing motion compensation. For each slice, two sets of multiplicative weight values and additive offset values are indicated explicitly and are applied separately to the motion compensated prediction, one at a time for each reference list. This technique is most effective when illuminance changes linearly and equally from picture to picture.

Local Illuminance Compensation.

Figure 3:
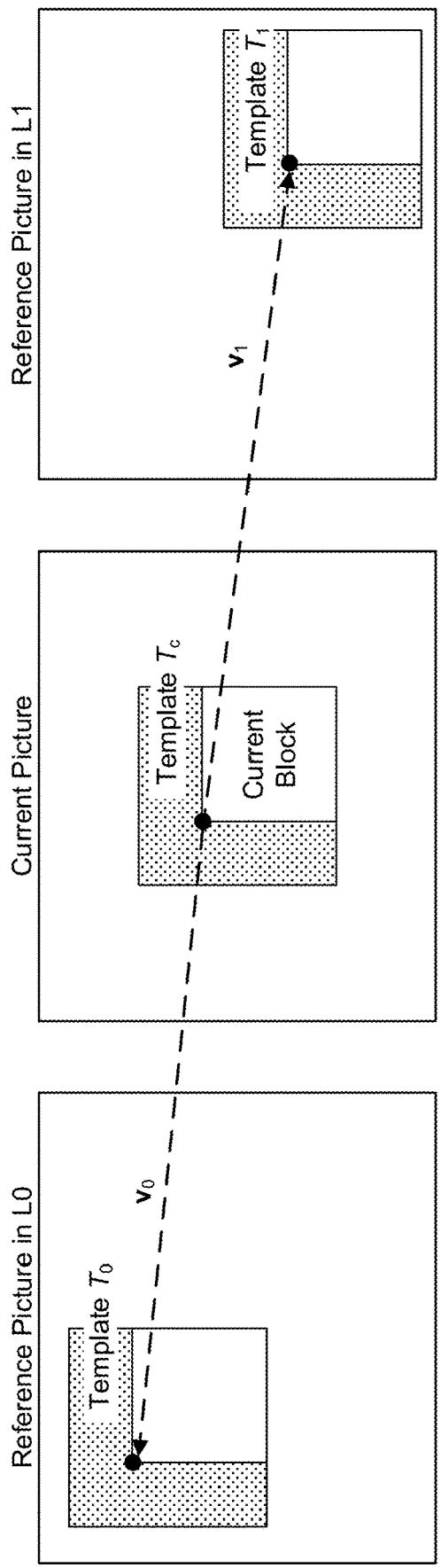
FIG. 3 is a schematic illustration of prediction using a template, $T_c$, and associated prediction blocks, $T_0$ and $T_1$.

In local illuminance compensation, parameters (two pairs of multiplicative weight values and additive offset values) are adapted on a block-by-block basis. Unlike the weighted bi-prediction which indicates these parameters at slice level, this technique resorts to adapting the optimal parameters to the illuminance change between the reconstruction signals of the template ($T_C$) and the prediction signals ($T_0$ and $T_1$) of the template (see FIG. 3). The resulting parameters are optimized by minimizing the illuminance difference separately between $T_C$ and $T_0$ (for the first pair of weight and offset values) and between $T_C$ and $T_1$ (for the second pair of weight and offset values). Then, the same motion compensation process as for weighted bi-prediction is performed with the derived parameters.

Effects of Illuminance Changes.

Figure 4:
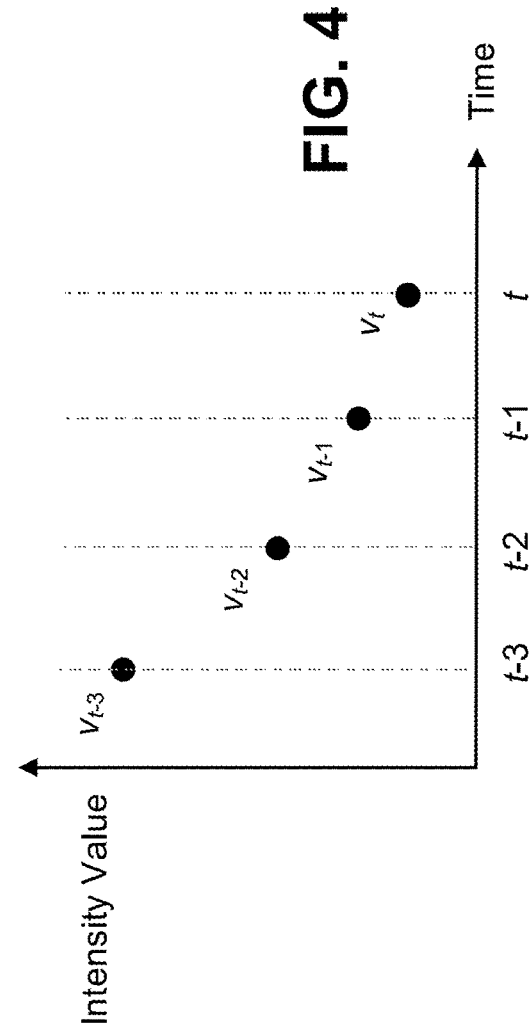
FIG. 4 is a graph providing a schematic illustration of illuminance change over time.

A change in illuminance over space and time could impact severely on the performance of motion-compensated prediction. As can be seen in FIG. 4, when illuminance fades along the time direction, motion-compensated prediction does not provide good performance. For example, a sample of an object travels over a period of time from t−3 to t, and the intensity value of this sample changes from $v_{t-3}$ to $v_t$ along its motion trajectory. Supposing this sample is to be predicted at the t-th picture, its prediction value is bounded within $v_{t-3}$ and $v_{t-1}$ and thus a poor motion-compensated prediction may result. The aforementioned techniques of weighted bi-prediction and local illuminance compensation may not fully solve this problem. Weighted bi-prediction may fail because illuminance may fluctuate intensively within a picture. Local illuminance compensation would sometimes produce poor estimation of weights and offset values due to the low illuminance correlation between a block and its associated template block. These examples show that the global description and template-based local description are not sufficient for representing the illuminance variation over space and time.

Exemplary Embodiments

Exemplary embodiments described herein may improve the prediction efficiency for weighted motion-compensated prediction. In some embodiments, systems and methods are proposed for generalized multi-hypothesis prediction using motion compensated prediction and block-level weight values for combining multi-hypothesis prediction signals linearly. In some embodiments, a generalized bi-prediction framework is described using a weight value. In some embodiments, a finite set of weights is used at the sequence, picture or slice level, and a construction process for the set of weights is described. In some embodiments, the weight value is determined based on the given weight set and optimized considering the signals of a current block and its reference blocks. Exemplary coding methods are described for signaling weight values. Exemplary encoder search criteria are described for the motion estimation process for the proposed prediction, and proposed prediction processes in combination with a disclosed temporal prediction technique are described.

In this disclosure, systems and methods are described for temporal prediction using generalized multi-hypothesis prediction. Exemplary encoders and decoders using generalized bi-prediction are described with respect to FIG. 5 and FIG. 9. Systems and methods disclosed herein are organized in sections as follows. The section "Generalized Multi-Hypothesis Prediction" describes exemplary embodiments using generalized multi-hypothesis prediction. The section "Generalized Bi-Prediction" discloses exemplary framework and prediction processes of the generalized bi-prediction. The sections "Construction of Weight Set" and "Weight Index Coding" describe exemplary construction processes for the weight set and describe exemplary techniques for signaling the choice of weights in this set, respectively. In the section "Extensions to Advanced Temporal Prediction Techniques" systems and methods are described for combining exemplary proposed prediction method with advanced inter prediction techniques, including local illuminance compensation and weighted bi-prediction, merge mode, overlapped block motion compensation, affine prediction, bi-directional optical flow, and a decoder-side motion vector derivation technique referred to as frame-rate up conversion bi-prediction. In the section "GBi Prediction Search Strategy," exemplary encoder-only methods are described for enhancing the efficiency of exemplary prediction methods.

Generalized Multi-Hypothesis Prediction.

Exemplary systems and methods described herein employ a generalized multi-hypothesis prediction. Generalized multi-hypothesis prediction may be described as a generalized form of multi-hypothesis prediction to provide an estimate of a pixel's intensity value based on linearly combining multiple motion-compensated prediction signals. Generalized multi-hypothesis prediction may exploit benefits of multiple predictions with different qualities by combining them together. To reach an accurate estimate, motion-compensated prediction signals may be processed (e.g. gamma correction, local illuminance correction, dynamic range conversion) through a predefined function $f(\cdot)$ and may then be combined linearly. Generalized multi-hypothesis prediction can be described with reference to Eq. (1):

$$P[x]=\sum_{i=1}^{n} w_i * f(P_i[x+v_i]) \tag{1}$$

where P[x] denotes the resulting prediction signal of a sample x located at a picture position x, $w_i$ represents a weight value applied to the i-th motion hypothesis from the i-th reference picture, $P_i[x+v_i]$ is the motion-compensated prediction signal of x using the motion vector (MV) $v_i$, and n is the total number of motion hypotheses.

One factor to consider with respect to motion-compensated prediction is how the accuracy of the motion field and the required motion overhead are balanced to reach the maximal rate-distortion performance. An accurate motion field implies better prediction; however, the required motion overhead may sometimes outweigh the prediction accuracy benefit. As such, in exemplary embodiments, the proposed video encoder is capable of switching adaptively among a different number, n, of motion hypotheses, and an n value that provides optimal rate-distortion performance is found for each respective PU. To facilitate explaining how the generalized multi-hypothesis prediction works, the value of n=2 is selected as an example in the following section as two motion hypotheses are commonly used in most modern video coding standards, although other values of n may alternatively be used. To simplify understanding of exemplary embodiments, the equation $f(\cdot)$ is treated as an identity function and thus is not set forth explicitly. Application of the systems and methods disclosed herein to cases in which $f(\cdot)$ is not an identity function will be apparent to those skilled in the art in view of the present disclosure.

Generalized Bi-Prediction.

The term generalized bi-prediction (GBi) is used herein to refer to a special case of generalized multi-hypothesis prediction, in which the number of motion hypotheses is limited to 2, that is, n=2. In this case, the prediction signal at sample x as given by Eq. (1) can be simplified to $$P[x]=w_0 * P_0[x+v_0]+w_1 * P_1[x+v_1], \tag{2}$$

where $w_0$ and $w_1$ are the two weight values shared across all the samples in a block. Based on this equation, a rich variety of prediction signals can be generated by adjusting the weight value, $w_0$ and $w_1$. Some configurations to $w_0$ and $w_1$ may lead to the same prediction as conventional uni-prediction and bi-prediction, such as $(w_0, w_1)=(1, 0)$ for uni-prediction with reference list L0, (0, 1) for uni-prediction with reference list L1, and (0.5, 0.5) for bi-prediction with two reference lists. In the cases of (1, 0) and (0, 1), only one set of motion information is signaled since the other set associated with a weight value equal zero does not take any effect on the prediction signal P[x].

Flexibility in the values of $w_0$ and $w_1$, particularly at high levels of precision, can incur the cost of a high signaling overhead. To save signaling overhead, in some embodiments, the unit-gain constraint is applied, that is $w_0+w_1=1$, and thus only one weight value per block is indicated explicitly for GBi coded PU. To further reduce the overhead of weight signaling, the weight value may be signaled at the CU level instead of the PU level. For ease of explanation, $w_1$ is signaled in this disclosure discussion, and thus Eq. (2) can be further simplified as $$P[x]=(1-w_1)*P_0[x+v_0]+w_1*P_1[x+v_1], \qquad (3)$$

In exemplary embodiments, to further limit signaling overhead, frequently-used weight values may be arranged in a set (referred hereafter to as $W_{L1}$), so each weight value can be indicated by an index value, that is the weight_idx pointing to which entry it occupies in $W_{L1}$, within a limited range.

In exemplary embodiments, generalized bi-prediction does not introduce an additional decoding burden to support producing the weighted average of two reference blocks. Since most of the modern video standards (e.g. AVC, HEVC) support weighted bi-prediction, the same prediction module can be adapted for use in GBi prediction. In exemplary embodiments, generalized bi-prediction may be applied not only to conventional uni-prediction and bi-prediction but also to other advanced temporal prediction techniques, such as affine prediction, advanced temporal motion vector derivation and bi-directional optical flow. These techniques aim to derive the motion field representation at a finer unit (e.g. 4×4) with a very low motion overhead. Affine prediction is a model-based motion field coding method, in which the motion of each unit within one PU can be derived based on the model parameters. Advanced temporal motion vector derivation involves deriving the motion of each unit from the motion field of temporal reference picture. Bi-directional optical flow involves deriving the motion refinement for each pixel using the optical flow model. No matter what the size of the unit is, once the weight value is specified at the block level, the proposed video codec can perform the generalized bi-prediction unit by unit using these derived motions and the given weight value.

Exemplary encoders and decoders employing generalized bi-prediction are described in greater detail below.

Exemplary Encoder for Generalized Bi-Prediction.

Figure 5:
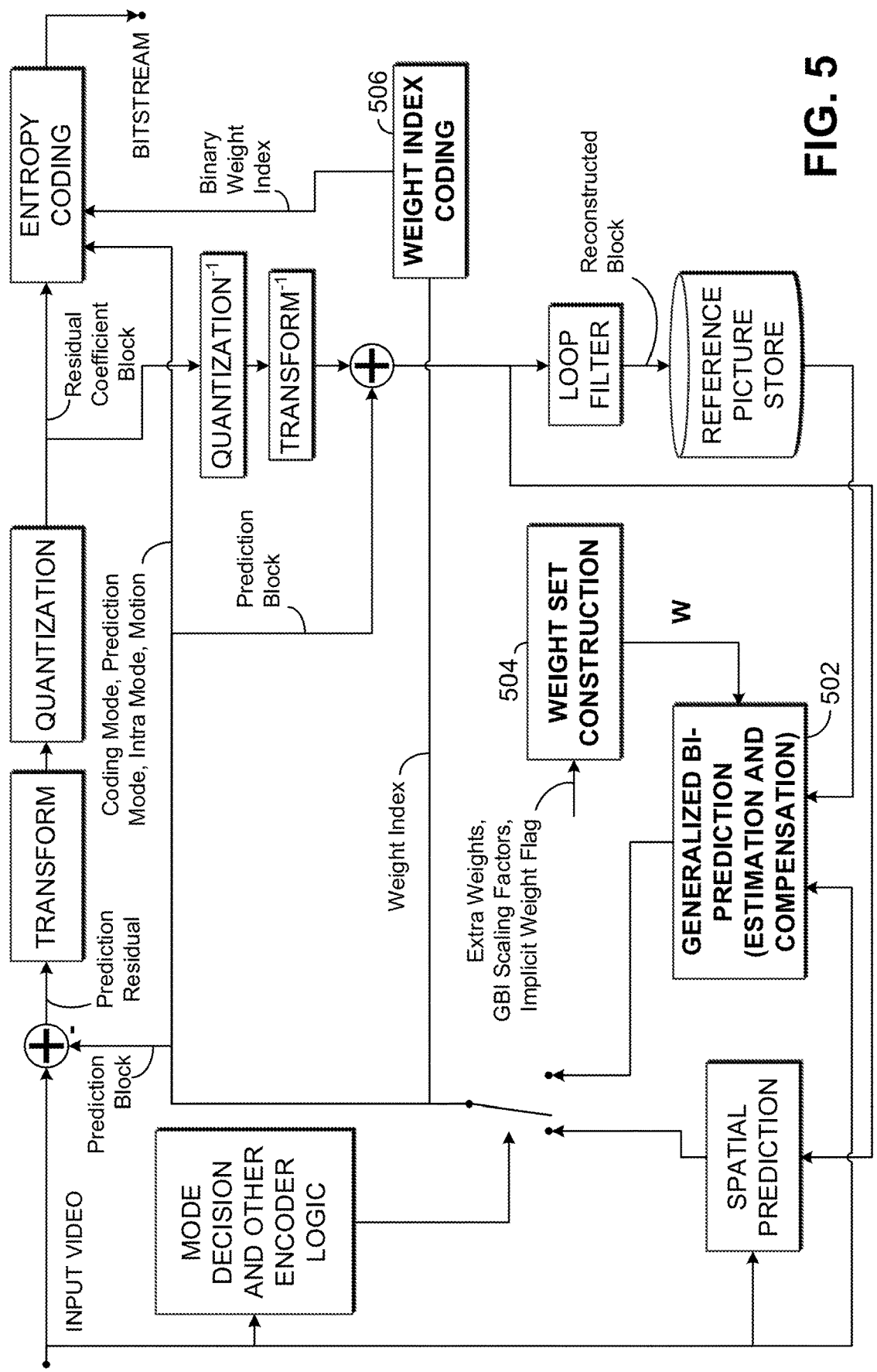
FIG. 5 is a functional block diagram illustrating a video encoder configured to use generalized bi-prediction according to some embodiments.
Figure 6:
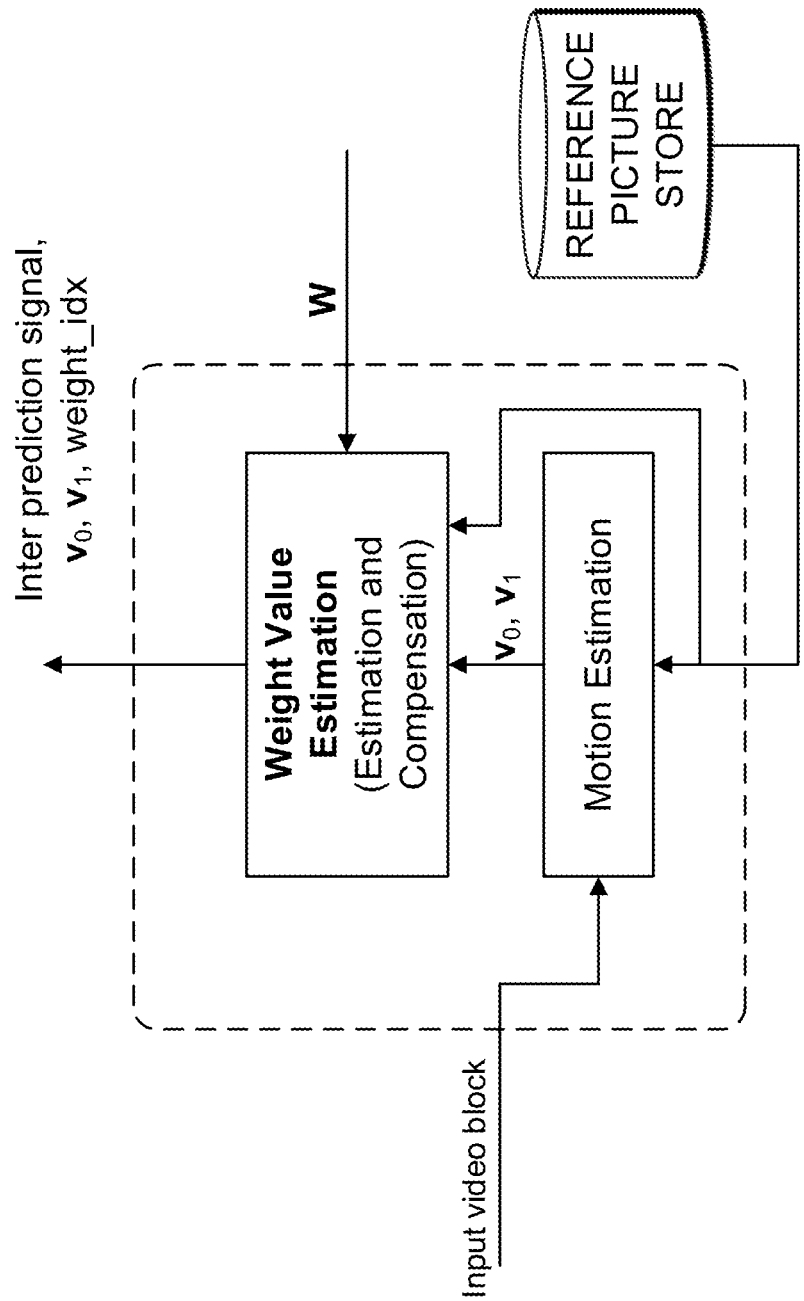
FIG. 6 is a functional block diagram of an exemplary generalized bi-prediction module for use in a video encoder.

FIG. 5 is a block diagram of an exemplary video encoder adapted to perform generalized bi-prediction. Analogous to the video encoder shown in FIG. 1, spatial prediction and temporal prediction are the two basic pixel-domain prediction modules in the exemplary video encoder. The spatial prediction module may be the same as the one illustrated in FIG. 1. The temporal prediction module labeled "motion prediction" in FIG. 1 may be replaced by a generalized bi-prediction (GBi) module 502. The generalized bi-prediction (GBi) module may be operative to combine two separate motion compensated prediction (MCP) signals in a weighted-averaging manner. As depicted in FIG. 6, the GBi module may implement a process to generate a final inter prediction signal as follows. The GBi module may perform motion estimation in reference picture(s) for searching two optimal motion vectors (MVs) pointing to two reference blocks that minimize the weighted bi-prediction error between the current video block and bi-prediction prediction. The GBi module may fetch these two prediction blocks through motion compensation with those two optimal MVs. The GBi module may subsequently compute a prediction signal of the generalized bi-prediction as a weighted average of the two prediction blocks.

In some embodiments, all the available weighting values are specified in a single set. As the weighting values may cost a large number of bits if they are signaled for both reference lists at the PU level, which means it signals two separate weighting values per bi-prediction PU, the unit-gain constraint (the sum of weight values being equal to 1) may be applied. Under this constraint, only one single weight value per PU is signaled while the other one can be derived from subtracting the signaled weight value from one. For ease of explanation, in this disclosure, weight values associated with reference list L1 are signaled, and the set of weight values is denoted by $W_{L1}$. To further save signaling overhead, the weight value is coded by an index value, weight_idx, pointing to the entry position in $W_{L1}$. With proper assignments to $W_{L1}$, both conventional uni-prediction (with weights equal to 0 for one reference list and 1 for the other list) and conventional bi-prediction (with a weight value equal to 0.5 for both reference lists) can be represented under the framework of GBi. In a special case of $W_{L1}=\{0, 0.5, 1\}$, the GBi module can achieve the same functionality of motion prediction module as depicted in FIG. 1.

Figure 7:
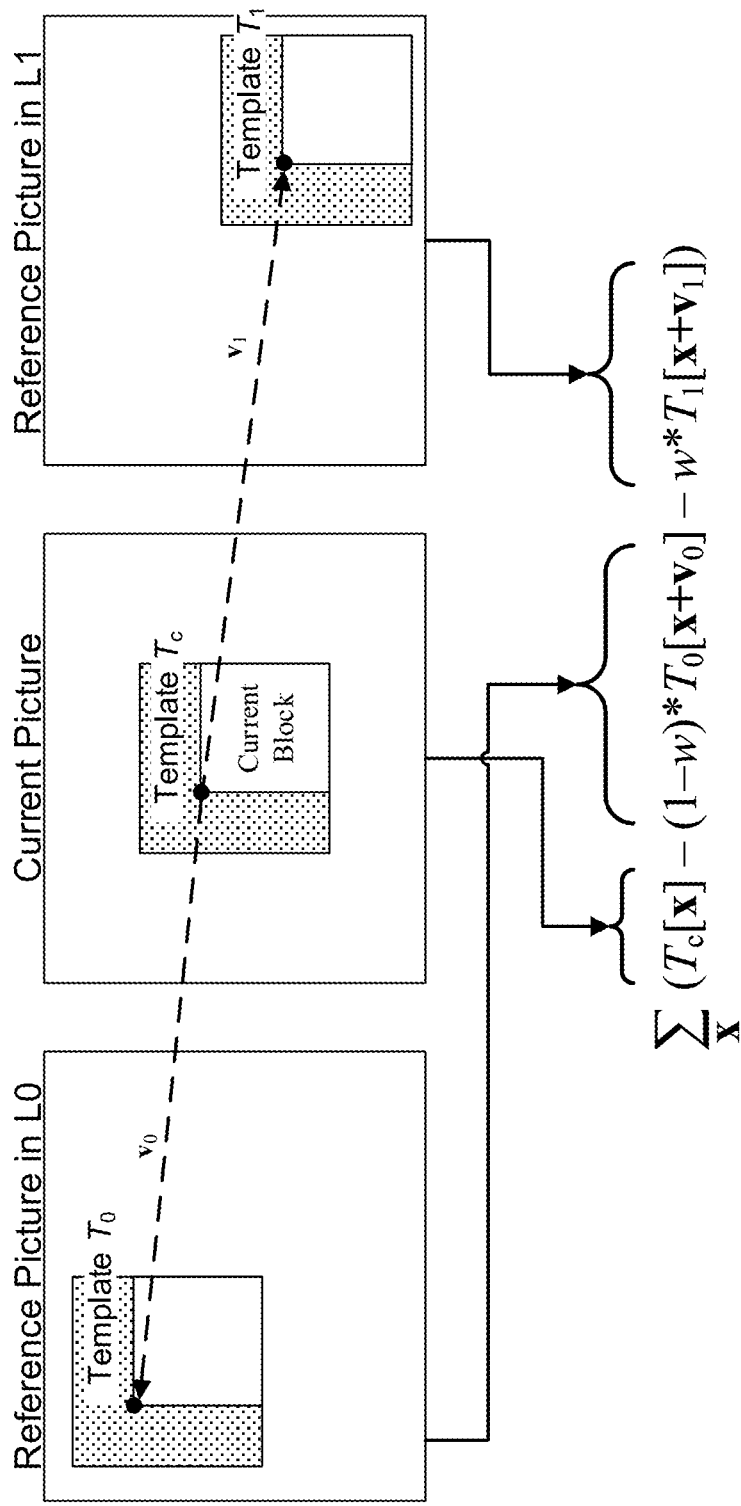
FIG. 7 is a schematic illustration of an exemplary decoder-side derivation of implicit weight value for use in generalized bi-prediction.

In addition to $\{0, 0.5, 1\}$, extra weight values for $W_{L1}$ may be specified at the slice, picture or sequence level with a non-negative integer number, extra_number_of_weights, indicating the number of them, so there are extra_number_of_weights+3 separate weights in the framework of GBi. In particular, in an exemplary embodiment, when extra_number_of_weights is greater than zero, one of these extra weight values can be derived on a block-by-block basis, depending on the control of a flag, implicit_weight_flag, present at the slice, picture, or sequence level. When this flag is set equal to 1, this particular weight value is not signaled but may be derived as shown in FIG. 7 by finding the one that can minimize the difference between the generalized bi-prediction signals of the immediate inverse-L-shape neighborhood (referred to as template) and the reconstruction signals of the template. The aforementioned process related to the construction of $W_{L1}$ may be performed by a Weight Set Construction module 504.

In order to make the extra weight values in $W_{L1}$ adaptive to pictures with high dynamics of illuminance change, two scaling factors (gbi_scaling_factors) may be applied and signaled at the picture level. With them, the Weight Set Construction module can scale the values of extra weights for GBi prediction. After inter prediction (that is GBi prediction in the proposed video encoder) and intra prediction, the original signal may be subtracted from this final prediction signal and the resulting prediction residual signal for coding is thus produced.

In an exemplary proposed video encoder, the block motion (motion vectors and reference picture indices) and weight value index are the only block-level information to be indicated for each inter coded PU.

In an exemplary embodiment, the block motion information of the GBi prediction is coded in the same way as that of the underlying video codec. Two sets of motion information per PU are signaled, except when weight_idx is associated with weights equal to 0 or 1, that is, an equivalent case to uni-prediction.

Figure 8:
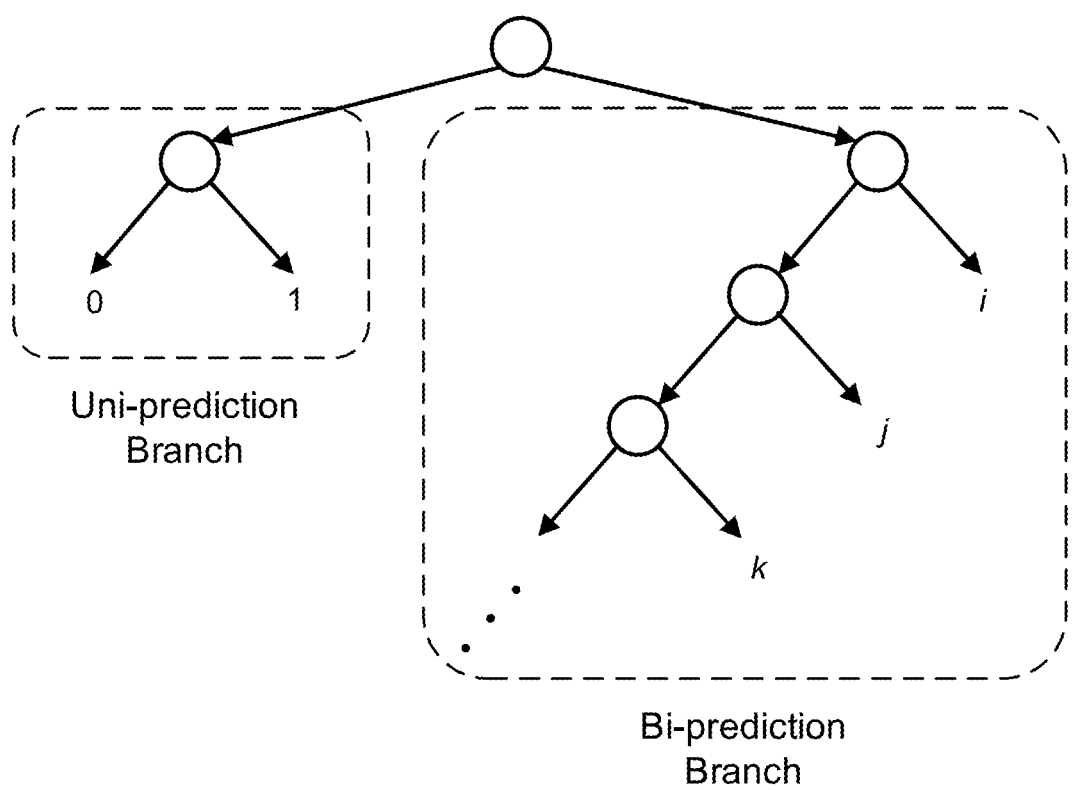
FIG. 8 is a schematic illustration of a tree structure for binarizing weight_idx, where each circle denotes a bit to be signaled.

A Weight Index Coding module 506 is used in an exemplary video encoder to binarize the weight_idx of each PU. The output of the Weight Index Coding module may be a unique binary representation, binary_weight_idx, of weight_idx. The tree structure of an exemplary binarization scheme is illustrated in FIG. 8. As with conventional inter prediction, the first bit of binary_weight_idx may differentiate uni-prediction (weight indices associated with weight values equal to 0 or 1) and bi-prediction (weight indices associated with weight values other than 0 and 1 in $W_{L1}$) for each inter PU. In the uni-prediction branch, another bit is signaled to indicate which of the L0 reference list (the weight index associated with the weight value equal to 0) or L1 reference list (the weight index associated with the weight value equal to 1) is referenced. In the bi-prediction branch, each leaf node is assigned with a unique weight index value associated with one of the remaining weight values, that are, neither 0 nor 1 in $W_{L1}$. At the slice or picture level, the exemplary video encoder may either switch adaptively between several predefined assignment manners or assign each weight to a unique leaf node dynamically on a PU-by-PU basis based on the usage of weight values from previously coded blocks. In general, frequently used weight indices are assigned to leaf nodes close to the root in the bi-prediction branch, while others are assigned on the contrary to deeper leaf nodes far from the root. Through traversing this tree in FIG. 8, every weight_idx can be converted into a unique binary_weight_idx for entropy coding.

Decoding Framework of Generalized Bi-Prediction.

Figure 9:
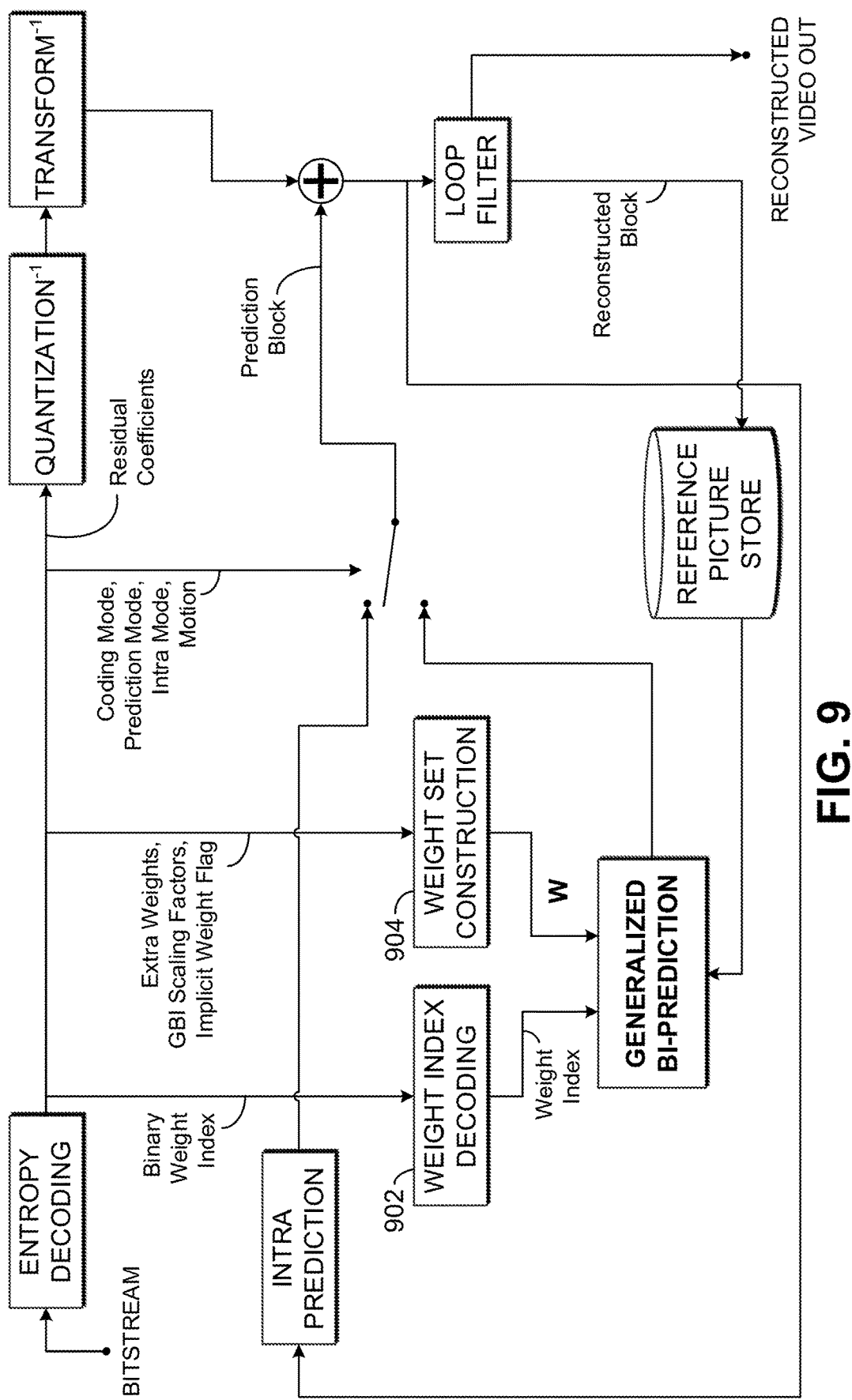
FIG. 9 is a functional block diagram illustrating a video decoder configured to use generalized bi-prediction according to some embodiments.

FIG. 9 is a block diagram of a video decoder in some embodiments. The decoder of FIG. 9 may be operative to decode a bit-stream produced by the video encoder illustrated in FIG. 5. The coding mode and prediction information may be used to derive the prediction signal using either spatial prediction or generalized bi-prediction. For the generalized bi-prediction, the block motion information and weight value are received and decoded.

A Weight Index Decoding module 902 decodes the weight index coded by the Weight Index Coding module 506 in the proposed video encoder. The Weight Index Decoding module 902 reconstructs the same tree structure as the one specified in FIG. 8, and each leaf node on the tree is assigned with a unique weight_idx in the same way as for the proposed video encoder. In this way, this tree is synchronized across the proposed video encoder and decoder. Through traversing this tree, every received binary_weight_idx may find its associated weight_idx at a certain leaf node on the tree. An exemplary video decoder, like the video encoder of FIG. 5, includes a Weight Set Construction module 904 to construct the weight set, $W_{L1}$. One of the extra weight values in $W_{L1}$ may be derived instead of being signaled explicitly when implicit_weight_flag is equal to 1, and all the extra weight values in $W_{L1}$ may further be scaled using the scaling factor indicated by gbi_scaling_factors. Then, the reconstruction of weight value may be done by fetching the one pointed to by the weight_idx from $W_{L1}$.

The decoder may receive one or two sets of motion information depending on the choice of weight value at each block. When the reconstructed weight value is neither 0 nor 1, two sets of motion information can be received; otherwise (when it is 0 or 1), only one set of motion information that is associated with the nonzero weight is received. For example, if the weight value is equal to 0, then only the motion information for reference list L0 will be signaled; otherwise if the weight value is equal to 1, only the motion information for reference list L1 will be signaled.

Figure 10:
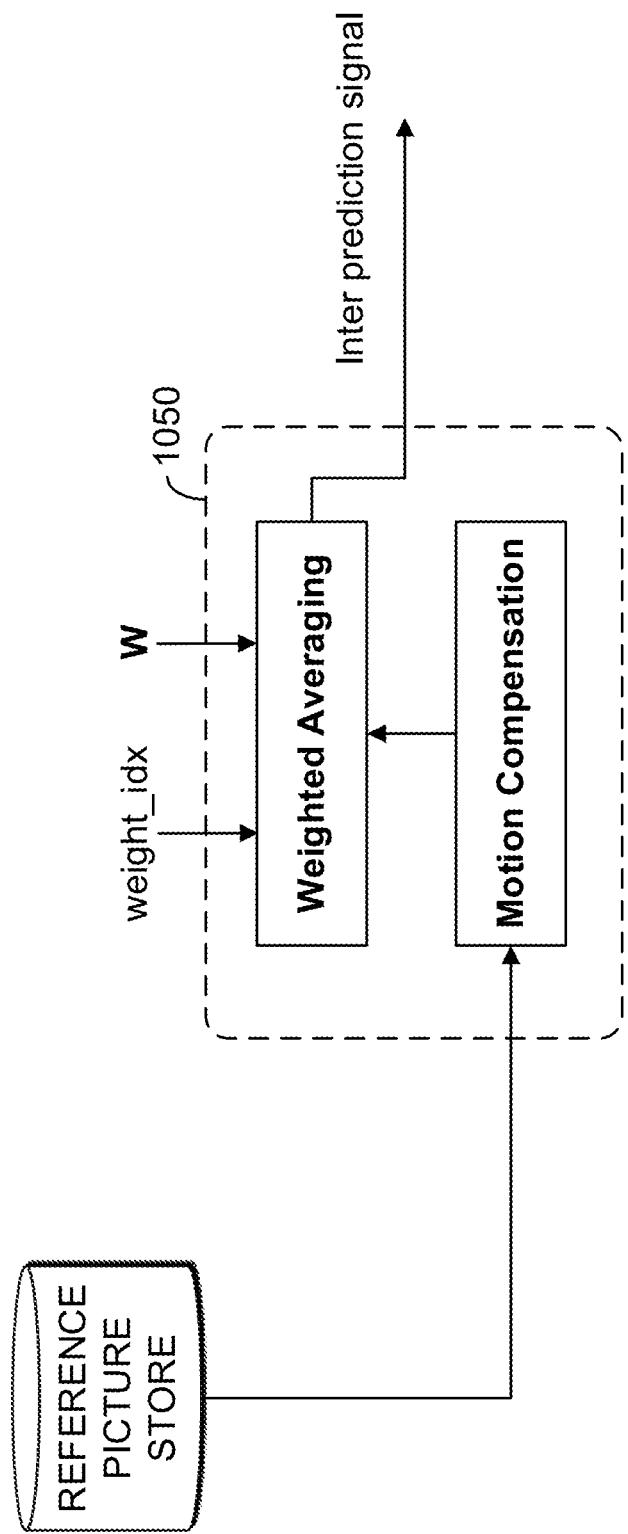
FIG. 10 is a functional block diagram of an exemplary generalized bi-prediction module for use in a video decoder.

With the block motion information and weight value, the Generalized Bi-prediction module 1050 illustrated in FIG. 10 may operate to compute the prediction signal of generalized bi-prediction as a weighted average of the two motion compensated prediction blocks.

Depending on the coding mode, either spatial prediction signal or generalized bi-prediction signal may be added up with the reconstructed residual signal to get the reconstructed video block signal.

Construction of Weight Set.

An exemplary construction process of the weight set, $W_{L1}$, using explicit signaled weights, decoder-side derived weights, and scaled weights, is described below, along with an exemplary pruning process to compact the size of the weight set $W_{L1}$.

Explicit Weight Values.

Explicit weight values may be signaled and managed hierarchically at each of the sequence, picture and slice levels. Weights specified at lower levels may replace those at higher levels. Supposing the number of explicit weights at a higher level is p and that at a relatively lower level is q, the following rules for replacement may be applied when constructing the weight value list at the lower level.

When p>q, the last q weights at the higher level are replaced by the q weights at the lower level.

When p≤q, all the weights at the higher level are replaced by those specified at the lower level.

The number of explicit weight values may be indicated by extra_number_of_weights at each of the sequence, picture and slice level. In some embodiments, at the slice level, the basic weight set always contains three default values, that form {0, 0.5, 1}, for GBi to support conventional uni-prediction and bi-prediction, so in total (extra_number_of_weights+3) weights can be used for each block. For example, when the values of extra_number_of_weights present at sequence, picture and slice levels are 2 (e.g. $w_A$, $w_B$), 1 (e.g. $w_C$) and 3 (e.g. $w_D$, $w_E$, $w_F$), respectively, the available weight values at sequence, picture and slice levels are $\{w_A, w_B\}$, $\{w_A, w_C\}$ and $\{0, 0.5, 1\} \cup \{w_D, w_E, w_F\}$, respectively. In this example, the $W_{L1}$ mentioned in the section "Generalized bi-prediction" is the slice-level weight set.

Derivation Process of Implicit Weight Value.

In some embodiments, a weight value in the slice-level weight set, $W_{L1}$, is derived through template matching at both the encoder and decoder without signaling. As depicted in FIG. 7, this implicit weight value may be derived by minimizing the difference between the prediction signals ($T_0$ and $T_1$) of the template with the motion information of current block and the reconstruction signals (i.e. $T_c$) of the template. This problem can be formulated as $$w^* = \arg\min_w \Sigma_x (T_c[x] - (1-w)*T_0[x+v_0] - w*T_1[x+v_1])^2, \quad (4)$$

where $v_0$ and $v_1$ are the motion vectors of the current block. As Eq. (4) is a quadratic function, a closed-form expression of the derived weight can be obtained if $T_0$ and $T_1$ are not exactly the same; that is $$w^* = \frac{\sum_x (T_0[x+v_0] - T_c[x])(T_0[x+v_0] - T_1[x+v_1])}{\sum_x (T_0[x+v_1] - T_1[x+v_1])^2}. \quad (5)$$

The effectiveness of this method can be seen when the weight value of the current block signals is correlated with that of the associated template prediction signals; however, this is not always guaranteed, especially when pixels in the current block and its associated template are located in different motion objects. To maximize the prediction performance of GBi, a flag, implicit_weight_flag, may be signaled at the slice, picture, or sequence level when extra_number_of_weights≥1 to determine whether the implicit weight is used. Once this is set equal to 1, the last slice-level weight value in $W_{L1}$ is derived and thus need not be signaled. For example, the $w_F$ aforementioned in the section "Explicit weight values" above does not need to be signaled, and the weight for the block may be implicitly derived when implicit_weight_flag is equal to 1.

Scaling Process of Weight Values.

In some embodiments, the explicit weight values may be further scaled by using gbi_scaling_factors, two scaling factors indicated at the picture level. Due to possible high dynamics of illuminance change in pictures over time, the dynamic range of these weight values may not be sufficient to cover all these cases. Although weighted bi-prediction can compensate the illuminance difference between pictures, it is not always guaranteed to be enabled in the underlying video codec. As such, these scaling factors may be used to regulate the illuminance difference over multiple reference pictures, when weighted bi-prediction is not used.

A first scaling factor may enlarge each explicit weight value in $W_{L1}$. With this, the prediction function of GBi in Eq. (3) can be expressed as $$P[x] = (\alpha*(1-w_1-0.5)+0.5)*P_0[x+v_0] + \qquad (6)$$
$$(\alpha*(w_1-0.5)+0.5)*P_1[x+v_1] =$$
$$(1-w_1')*P_0[x+v_0]+w_1'*P_1[x+v_1],$$

where α is the first scaling factor of the current picture and w represents the scaled weight value (that is $\alpha*(w_1-0.5)+0.5$). The first equation in Eq. (6) can be expressed in the same form as Eq. (3). The only difference is the weight values that are applied to Eqs. (6) and (3).

A second scaling factor may be used to reduce the illuminance-wise difference between the associated reference pictures of $P_0$ and $P_1$. With this scaling factor, the Eq. (6) can be further re-formulated as:

$$P[x] = (1-w_1')*\left(\frac{s}{s_0}*P_0[x+v_0]\right)+w_1'*\left(\frac{s}{s_1}*P_1[x+v_1]\right), \qquad (7)$$

where s, $s_0$ and $s_1$ represent the second scaling factors signaled at the current picture and its two reference pictures, respectively. According to Eq. (7), one optimal assignment to the variable s may be the mean value of samples in the current picture. Therefore, the mean values of the reference pictures may be expected to be similar after the second scaling factor is applied. Due to the commutative property, applying scaling factors to $P_0$ and $P_1$ is identical to apply them to weight values, and thus the Eq. (7) can be re-interpreted as:

$$P[x] = \left(\frac{s}{s_0}*(1-w_1')\right)*P_0[x+v_0]+\left(\frac{s}{s_1}*w_1'\right)*P_1[x+v_1]. \qquad (8)$$

Therefore, the construction process of the weight set can be expressed as a function of explicit weights, implicit weight, scaling factors and reference pictures. For example, the aforementioned slice-level weight set $W_{L1}$ becomes $\{0,0.5,1\} \cup \{(s/s_1)*w_D', (s/s_1)*w_E', (s/s_1)*w_F'\}$ and the weight set for L0 becomes $\{1,0.5,1\} \cup \{(s/s_0)*(1-w_D'), (s/s_0)*(1-w_E'), (s/s_0)*(1-w_F')\}$, where $s_1$ is the mean sample value of the reference picture in list L1 for current block, and so is the mean sample value of the reference picture in list L0 for current block.

Pruning of Weight Values.

Exemplary embodiments operate to further reduce the number of weight values in $W_{L1}$. Two exemplary approaches to pruning the weight values are described in detail below. A first approach operates in response to a motion-compensated prediction result and a second approach operates based on weight values outside the range between 0 and 1.

Prediction-Based Approach.

When the motion information of a PU is given, not every weight produces a bi-prediction that is substantially different from the others. An exemplary embodiment takes advantage of this property by pruning redundant weight values (which produce similar bi-prediction signals) and keeping only one weight from among the redundant values to make $W_{L1}$ more compact. To do so, a function may be used to compute the similarity between the bi-prediction signals of two different weight values. This function may be, but not is not limited to, the cosine similarity function, which operates as follows:

$$S(w^{(i)}, w^{(j)}; v_0, v_1) = \frac{\sum_x P[x; w^{(i)}, v_0, v_1]P[x; w^{(j)}, v_0, v_1]}{\sqrt{\sum_x P[x; w^{(i)}, v_0, v_1]}\sqrt{\sum_x P[x; w^{(j)}, v_0, v_1]}}, \qquad (9)$$

where $w^{(i)}$ and $w^{(j)}$ are two independent weight values in $W_{L1}$, $v_0$ and $v_1$ are given bi-prediction motion information, and $P[x; w,v_0,v_1]$ denotes the same prediction function as specified in Eqs. (3), (6) and (8) with given w, $v_0$ and $v_1$. When the value of Eq. (9) falls below a given threshold (indicated by weight_pruning_threshold at slice level), one of the weights may be pruned depending on this slice-level syntax, pruning_smaller_weight_flag. If this flag is set equal to 1, then the pruning process removes the smaller weight from $w^{(i)}$ and $w^{(j)}$ from $W_{L1}$. Otherwise (when this flag is set equal to 0), the larger one is removed. In an exemplary embodiment, this pruning process is applied to each pair of weight values in $W_{L1}$, and, as a result, no two weight values in the resulting $W_{L1}$ would produce similar bi-prediction signals. The similarity between two weight values can also be evaluated by using sum of absolute transformed differences (SATD). To reduce the computational complexity, this similarity may be evaluated using two subsampled prediction blocks. For example, it may be calculated with subsampled rows or subsampled columns of samples in both horizontal and vertical directions.

Weight Value Based Approach.

Weight values outside the range between 0 and 1 (or, in short, out-of-range weights) could behave differently, in terms of coding performance under different coding structures (e.g. hierarchical structure or low-delay structure). To take advantage of this fact, exemplary embodiments employ a set of sequence-level indices, weight_control_idx, to limit the use of out-of-range weights separately for each temporal layer. In such embodiments, each weight_control_idx is associated with all the pictures at a specific temporal layer. Depending on how this index is configured, out-of-range weights may be either available to use or pruned conditionally as follows.

For weight_control_idx=0, $W_{L1}$ remains unchanged for associated pictures.

For weight_control_idx=1, out-of-range weights in $W_{L1}$ are not available for associated pictures.

For weight_control_idx=2, out-of-range weights in $W_{L1}$ are available only for some of associated pictures whose reference frames come purely from the past (e.g. low-delay configuration in HEVC and JEM).

For weight_control_idx=3, out-of-range weights in $W_{L1}$ are available for associated pictures only when the slice-level flag in HEVC and JEM, mvd_l1_zero_flag, is enabled.

Weight Index Coding.

Exemplary systems and methods for binarization and codeword assignment for weight index coding are described in greater detail below.

Binarization Process for Weight Index Coding.

In exemplary embodiments, each weight index (weight_idx) is converted into a unique binary representation (binary_weight_idx) through a systematic code, before entropy encoding. For purposes of illustration, the tree structure of a proposed binarization method is illustrated in FIG. 8. The first bit of binary_weight_idx is used to differentiate uni-prediction (that is associated with weights equal to 0 or 1) and bi-prediction. Another bit is signaled in the uni-prediction branch to indicate which of two reference lists is referenced, either reference list L0 (associated with a weight index pointing to the weight value equal to 0) or reference list L1 (associated with a weight index pointing to a weight value equal to 1). In the bi-prediction branch, each leaf node is assigned with a unique weight index value associated with one of the remaining weight values, that are, neither 0 nor 1 in $W_{L1}$. An exemplary video codec supports a variety of systematic code for binarizing the bi-prediction branch, such as truncated unary code (e.g. FIG. 8) and Exponential-Golomb code. Exemplary techniques in which each leaf node in the bi-prediction branch is assigned with a unique weight_idx are described in greater detail below. Through looking up this tree structure, each weight index may be mapped to or recovered from a unique codeword (e.g. binary_weight_idx).

Adaptive Codeword Assignment for Weight Index Coding.

In an exemplary binary tree structure, each leaf node corresponds to one codeword. To reduce the signaling overhead of the weight index, various adaptive codeword assignment methods may be used to map each leaf node in the bi-prediction branch to a unique weight index. Exemplary methods include pre-determined codeword assignment, block-adaptive codeword assignment, temporal-layer based codeword assignment, and time-delay CTU-adaptive codeword assignment. These exemplary methods update the codeword assignment in the bi-prediction branch based on the occurrence of weight values used in previously coded blocks. Frequently-used weights may be assigned to codewords with shorter length (that is, shallower leaf nodes in the bi-prediction branch), while others may be assigned to codewords with relatively longer length.

1) Pre-Determined Codeword Assignment.

Using pre-determined codeword assignment, a constant codeword assignment may be provided for leaf nodes in the bi-prediction branch. In this method, the weight index associated with the 0.5 weight may be assigned with the shortest codeword, that is, the node i in FIG. 8, for example. The weight values other than 0.5 may be separated into two sets: Set one includes all values greater than 0.5, and it is ordered in an ascending order; Set two includes all values smaller than 0.5, and it is ordered in a descending order. Then, these two sets are interleaved to form Set three, either starting from Set one or Set two. All remaining codewords with length from short to long are assigned to the weight value in Set three in order. For example, when the set of all the possible weight values in the bi-prediction branch is $\{0.1, 0.3, 0.5, 0.7, 0.9\}$. Set one is $\{0.7, 0.9\}$, Set two is $\{0.3, 0.1\}$ Set three is $\{0.7, 0.3, 0.9, 0.1\}$ if interleaving starts from Set one. Codewords with length from short to long are assigned sequentially to 0.5, 0.7, 0.3, 0.9 and 0.1.

Figure 11A:
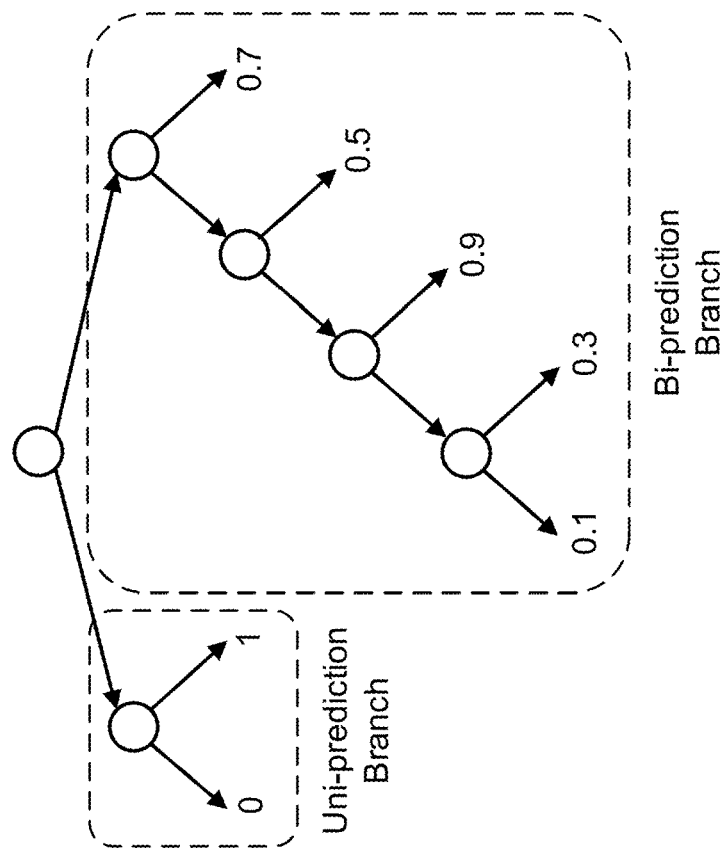
FIGS. 11A and 11B provide schematic illustrations of codeword assignment methods: constant assignment (FIG. 11A) and alternative assignment (FIG. 11B).
Figure 11B:
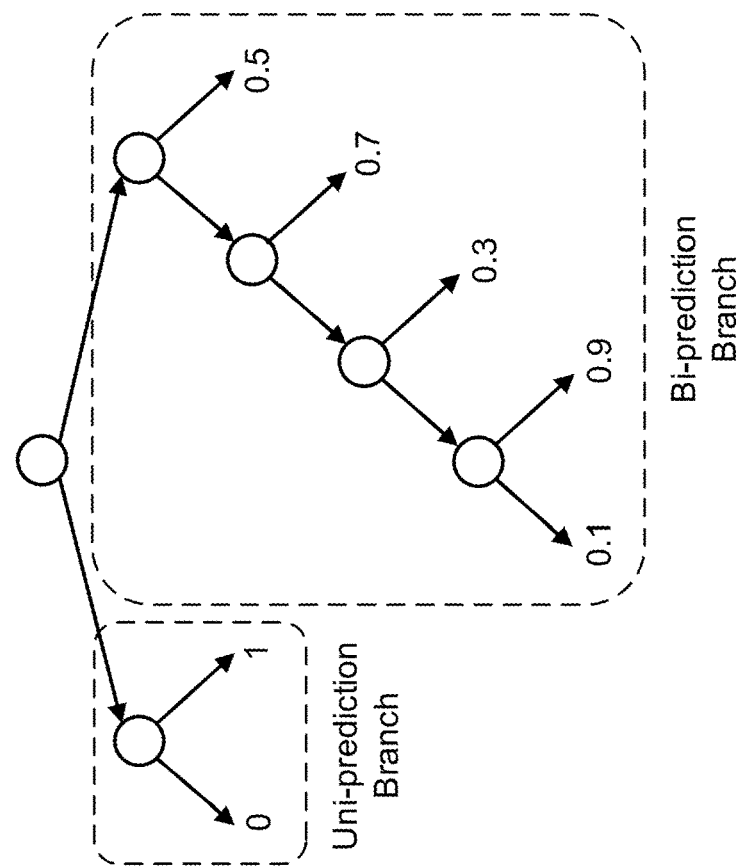

This assignment may change in the circumstance that some codec may drop one motion vector difference when two sets of motion information are sent. For example, this behavior can be found in HEVC from a slice-level flag, mvd_l1_zero_flag. In this case, an alternative codeword assignment assigns to the weight index associated with a weight value (e.g. $w^+$) that is larger than and the closest to 0.5. Then, the weight index associated with a weight value that is the n-th smallest (or largest) one from those being larger (or smaller) than $w^+$ is assigned with the (2n+1)-th (or 2n-th) shortest codeword. Based on the previous example, codewords with length from short to long are assigned to 0.7, 0.5, 0.9, 0.3 and 0.1 sequentially. The resulting assignments of both examples are illustrated in FIGS. 11A-11B.

2) Block-Adaptive Codeword Assignment Using Causal-Neighboring Weights.

Figure 12A:
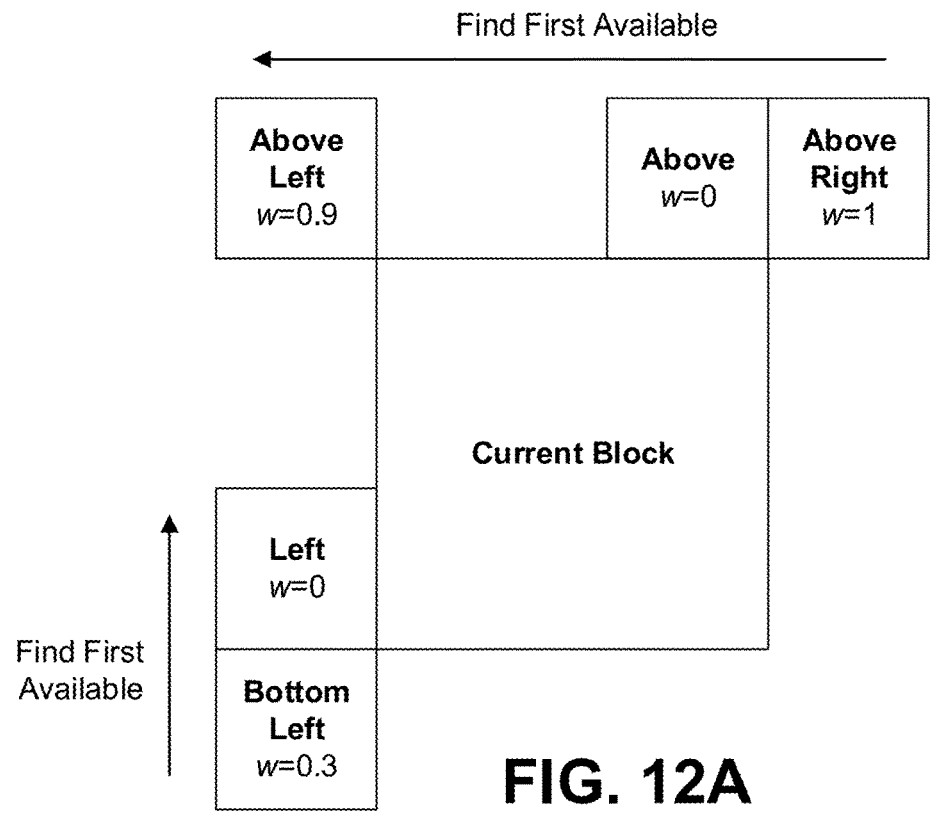
FIGS. 12A and 12B are schematic illustrations providing an example of block-adaptive codeword assignment: weight value field (FIG. 12A) and the resulting codeword assignment updated from the constant assignment (FIG. 12B).
Figure 12B:
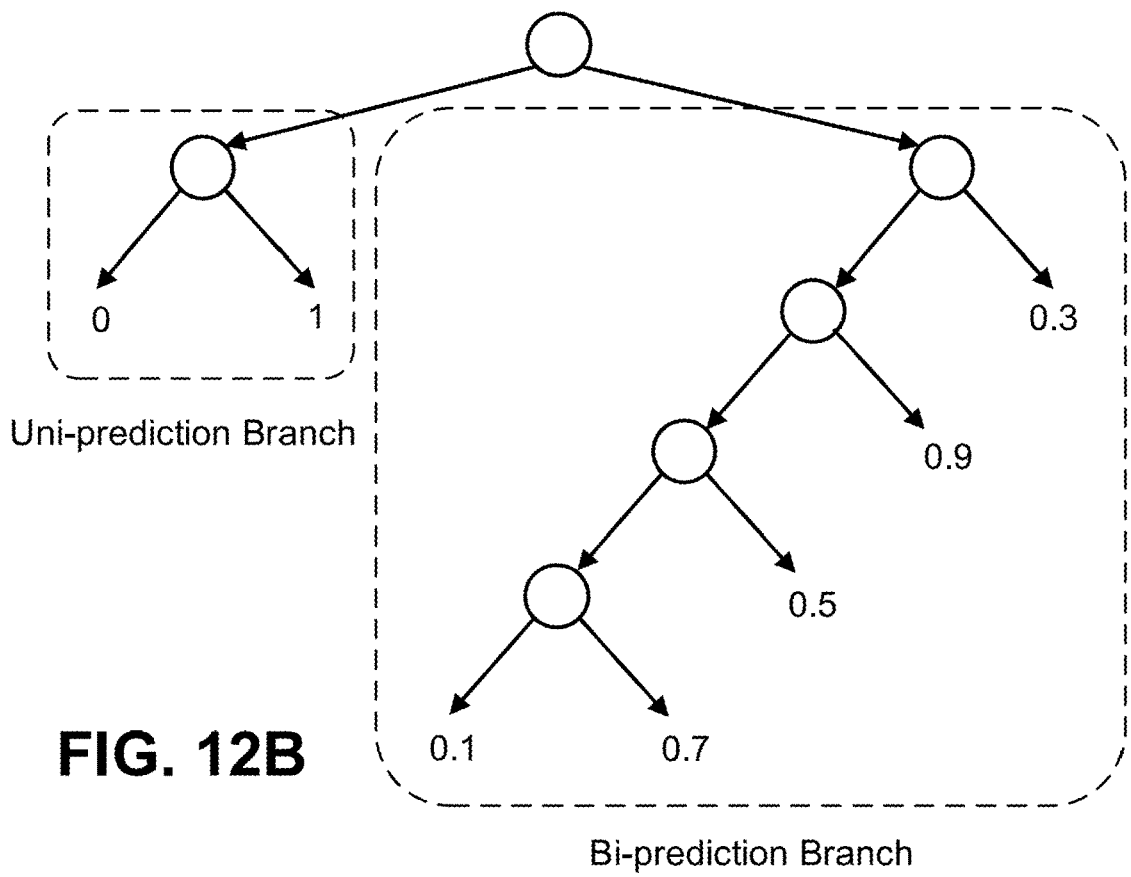

Weight values used in causal-neighboring blocks may be correlated with the one used for the current block. Based on this knowledge and a given codeword assignment method (e.g. the constant assignment or alternative assignment), weight indices that can be found from causal-neighboring blocks are promoted to leaf nodes in the bi-prediction branch with shorter codeword length. Analogous to the construction process of a motion vector prediction list, causal-neighboring blocks may be accessed in an ordered sequence as depicted in FIG. 12A, and at most two weight indices may be promoted. As can be seen from the illustration, from the bottom-left block to the left block, the first available weight index (if any) may be promoted with the shortest codeword length; from the above-right block to the above-left block, the first available weight index (if any) may be promoted with the second shortest codeword length. For the other weight indices, they may be assigned to the rest of leaf nodes from the shallowest to the deepest according to their codeword length in the originally given assignment. FIG. 12B gives an example showing how a given codeword assignment may adapt itself to causal-neighboring weights. In this example, the constant assignment is used and weight values equal to 0.3 and 0.9 are promoted.

3) Temporal-Layer Based Codeword Assignment.

In an exemplary method using temporal-layer based codeword assignment, the proposed video encoder switches adaptively between the constant codeword assignment and alternative codeword assignment. Based on the usage of weight indices from previously coded pictures at the same temporal layer or with the same QP value, the optimal codeword assignment method with minimal expected codeword length of weight indices may be found as follows:

$$m^* = \mathrm{argmin}_{m \in (constant, alternative)} \Sigma_{w \in W_{L1}^{Bi}} L_m(w)^* \mathrm{Prob}_k(w), \qquad (10)$$

where $L_m(w)$ denotes the codeword length of w using a certain codeword assignment method m, $W_{L1}^{Bi}$ is the weight value set used for bi-prediction only, and $\mathrm{Prob}_k(w)$ represents the cumulative probability of w over k pictures at a temporal layer. Once the best codeword assignment method is determined, it may be applied to encoding the weight indices or parsing the binary weight indices for the current picture.

Several different methods are contemplated for accumulating the usage of weight indices over temporal pictures. Exemplary methods can be formulated in a common equation:

$$Prob_k(w_i) = \frac{\sum_{j=k-n+1}^{k} Count_j(w_i)}{\sum_{w \in W_{L1}^{Bi}} \sum_{j=k-n+1}^{k} \lambda^{k-j} * Count_j(w)}, \quad (11)$$

where $w_i$ is a certain weight in $W_{L1}$, $Count_j(w)$ represents the occurrence of a certain weight value at j-th picture of a temporal layer, n determines the number of recent pictures to be memorized, $\lambda$ is a forgetting term. As n and $\lambda$ are encoder-only parameters, they can adapt themselves at each picture to various encoding conditions, such as n=0 for scene change and smaller $\lambda$ for motion videos.

In some embodiments, the choice of codeword assignment method may be indicated explicitly using a slice-level syntax element. As such, the decoder need not maintain the usage of weight indices over time, and thus the parsing dependency on weight indices over temporal pictures can be avoided completely. Such methods also improve decoding robustness.

4) CTU-Adaptive Codeword Assignment.

Switching between different methods for codeword assignment based solely on the weight usage of previously coded pictures may not always match well that of the current picture. This can be attributed to lacking of consideration for the weight usage of the current picture. In an exemplary embodiment using CTU-adaptive codeword assignment, $Prob_k(w_i)$ may be updated based on the weight usage of coded blocks within the current CTU row and the immediately above CTU row. Supposing the current picture is the (k+1)-th picture in a temporal layer, the $Prob_k(w_i)$ may be updated CTU-by-CTU as follows:

$$Prob_k(w_i) = \frac{\sum_{j=k-n+1}^{k} Count_k(w_i) + \sum_{j \in B} Count'_j(w_i)}{\sum_{w \in W_{L1}^{Bi}} \left( \sum_{j=k-n+1}^{k} \lambda^{k-j} * Count_j(w) + \sum_{j \in B} Count'_j(w_i) \right)}, \quad (12)$$

where B denotes the set of coded CTU's in the current CTU row and the immediately above CTU row, and $Count'_j(w)$ represents the occurrence of a certain weight value at j-th CTU collected in the set B. Once $Prob_k(w_i)$ is updated, then it is applied to Eq. (10), and the best codeword assignment method may thus be determined.

Extensions to Advanced Temporal Prediction Techniques.

Embodiments are discussed below for extending the application of generalized bi-prediction together with other coding technologies including local illuminance compensation, weighted bi-prediction, merge mode, bi-directional optical flow, affine motion prediction, overlapped block motion compensation, and frame-rate up conversion bi-prediction.

Local Illuminance Compensation and Weighted Bi-Prediction.

Exemplary generalized bi-prediction techniques can be performed on top of local illuminance compensation (IC) and/or weighted bi-prediction, among other techniques. Both IC and weighted bi-prediction operate to compensate illuminance change on reference blocks. One difference between them is that in the use of IC, weights ($c_0$ and $c_1$) and offset values ($o_0$ and $o_1$) are derived through template matching block by block, while in the use of weighted bi-prediction, these parameters are signaled explicitly slice by slice. With these parameters ($c_0$, $c_1$, $o_0$, $o_1$), the prediction signal of GBi can be computed as $$P[x] = \left(\frac{S}{S_0} * (1 - w'_1)\right) * (c_0 * P_0[x + v_0] + o_0) + \quad (13)$$
$$\left(\frac{S}{S_1} * w'_1\right) * (c_1 * P_1[x + v_1] + o_1),$$

where the scaling process of weight values descried in the section "Scaling process of weight values" above is applied. When this scaling process is not applied, the prediction signal of GBi may be computed as $$P[x] = (1-w_1)*(c_0*P_0[x+v_0]+o_0)+w_1*(c_1*P_1[x+v_1]+o_1). \quad (14)$$

The use of these combined prediction processes set forth in, e.g. Eq. (13) or (14) may be signaled at the sequence level, picture level, or slice level. Signaling may be conducted separately for the combination of GBi and IC and for the combination of GBi and weighted bi-prediction. In some embodiments, the combined prediction process of Eq. (13) or (14) is applied only when weight values ($w_1$) are not equal to 0, 0.5 or 1. In particular, when use of the combined prediction process is active, the value of a block-level IC flag (which is used to indicate the use of IC) determines whether GBi (with $w_1 \neq 0, 0.5, 1$) is combined with IC. Otherwise, when the combined prediction process is not in use, GBi (with $w_1 \neq 0, 0.5, 1$) and IC perform as two independent prediction modes, and for each block this block-level IC flag need not be signaled and is thus inferred as zero.

In some embodiments, whether GBi can be combined with IC or weighted bi-prediction is signaled with a high level syntax at sequence parameter set (SPS), picture parameter set (PPS), or slice header, separately, using a flag such as gbi_ic_comb_flag and gbi_wb_comb_flag. In some embodiments, if gbi_ic_comb_flag is equal to 0, GBi and IC are not combined, and therefore the GBi weight value ($w_1 \neq 0, 0.5, 1$) and IC flag will not coexist for any bi-prediction coding unit. For example, in some embodiments, if a GBi weight is signaled with $w_1 \neq 0, 0.5, 1$ for a coding unit, there will be no IC flag to be signaled and this flag value is inferred as zero; otherwise, IC flag is signaled explicitly. In some embodiments, if gbi_ic_comb_flag is equal to 1, GBi and IC are combined and both GBi weight and IC flag are signaled independently for one coding unit. The same semantics can be applied to gbi_wb_comb_flag.

Merge Mode.

Figure 13:
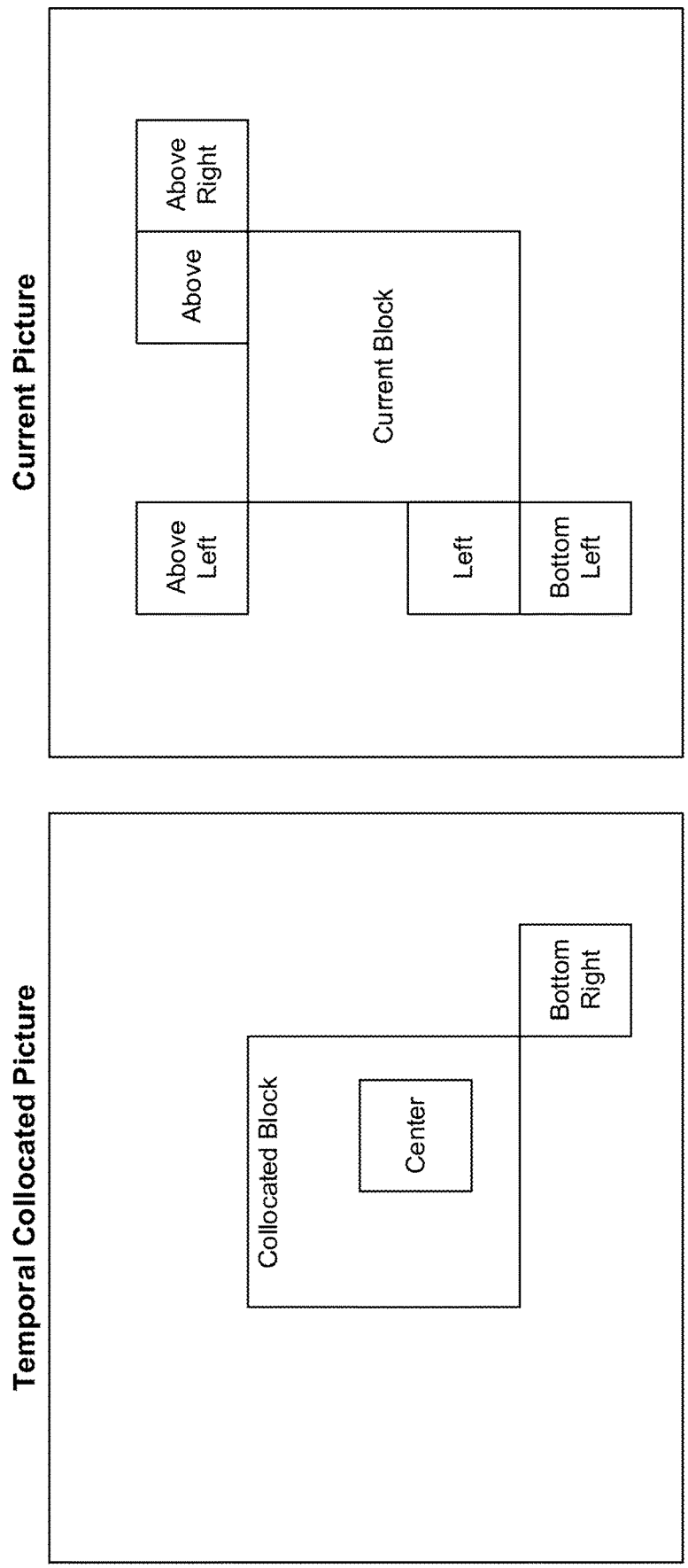
FIG. 13 is a schematic illustration of merge candidate positions.

In some embodiments, the merge mode is used to infer not only the motion information from a causal-neighboring block but also the weight index of that block at the same time. The access order to causal-neighboring blocks (as depicted in FIG. 13) may be the same as specified in HEVC, in which the spatial blocks are accessed in sequence of left, above, above right, bottom left and above right blocks, while the temporal blocks are accessed in sequence of bottom right and center blocks. In some embodiments, five merge candidates at most are constructed, with four at most from spatial blocks and one at most from temporal blocks. Given a merge candidate, then the GBi prediction process specified in Eqs. (3), (8), (13) or (14) may be applied. It is noted that the weight index need not be signaled because it is inferred from the weight information of the selected merge candidate.

In the JEM platform, an additional merge mode called advanced temporal motion vector prediction (ATMVP) is provided. In some embodiments of the present disclosure, ATMVP is combined with the GBi prediction. In ATMVP, the motion information of each 4×4 unit within one CU is derived from the motion field of a temporal reference picture. In exemplary embodiments using ATMVP, the weight index for each 4×4 unit may also be inferred from that of corresponding temporal block in temporal reference picture when GBi prediction mode is enabled (e.g. when extra_number_of_weights is larger than 0).

Bi-Directional Optical Flow.

In some embodiments, the weight value of GBi may be applied to the bi-directional optical flow (BIO) model. Based on the motion-compensated prediction signals ($P_0[x+v_0]$ and $P_1[x+v_1]$), BIO may estimate an offset value, $o_{BIO}[x]$, to reduce the difference between two corresponding samples in L0 and L1, in terms of their spatially vertical and horizontal gradient values. To combine this offset value with GBi prediction, the Eq. (3) can be re-formulated as $$P[x]=(1-w_1)*P_0[x+v_0]+w_1*P_1[x+v_1]+o_{BIO}[x], \quad (15)$$

where $w_1$ is the weight value used for performing GBi prediction. This offset value may also be applied to other GBi variations, like Eqs. (8), (13) or (14), as an additive offset after the prediction signals in $P_0$ and $P_1$ are scaled.

Affine Prediction.

In exemplary embodiments, GBi prediction may be combined with affine prediction in a manner analogous to the extension to conventional bi-prediction. However, there is a difference in the basic processing unit that is used for performing motion compensation. Affine prediction is a model-based motion field derivation technique to form a fine-granularity motion field representation of a PU, in which the motion field representation of each 4×4 unit is derived based on uni- or bi-directional translation motion vectors and the given model parameters. Because all the motion vectors point to the same reference pictures, it is not necessary to adapt the weight value to each of the 4×4 units. As such, the weight value may be shared across each unit and only one weight index per PU may be signaled. With the motion vectors at 4×4 unit and a weight value, the GBi can be performed on the unit-by-unit basis, so the same Eqs. (3), (8), (13) and (14) may be applied directly without change.

Overlapped Block Motion Compensation.

Figure 14:
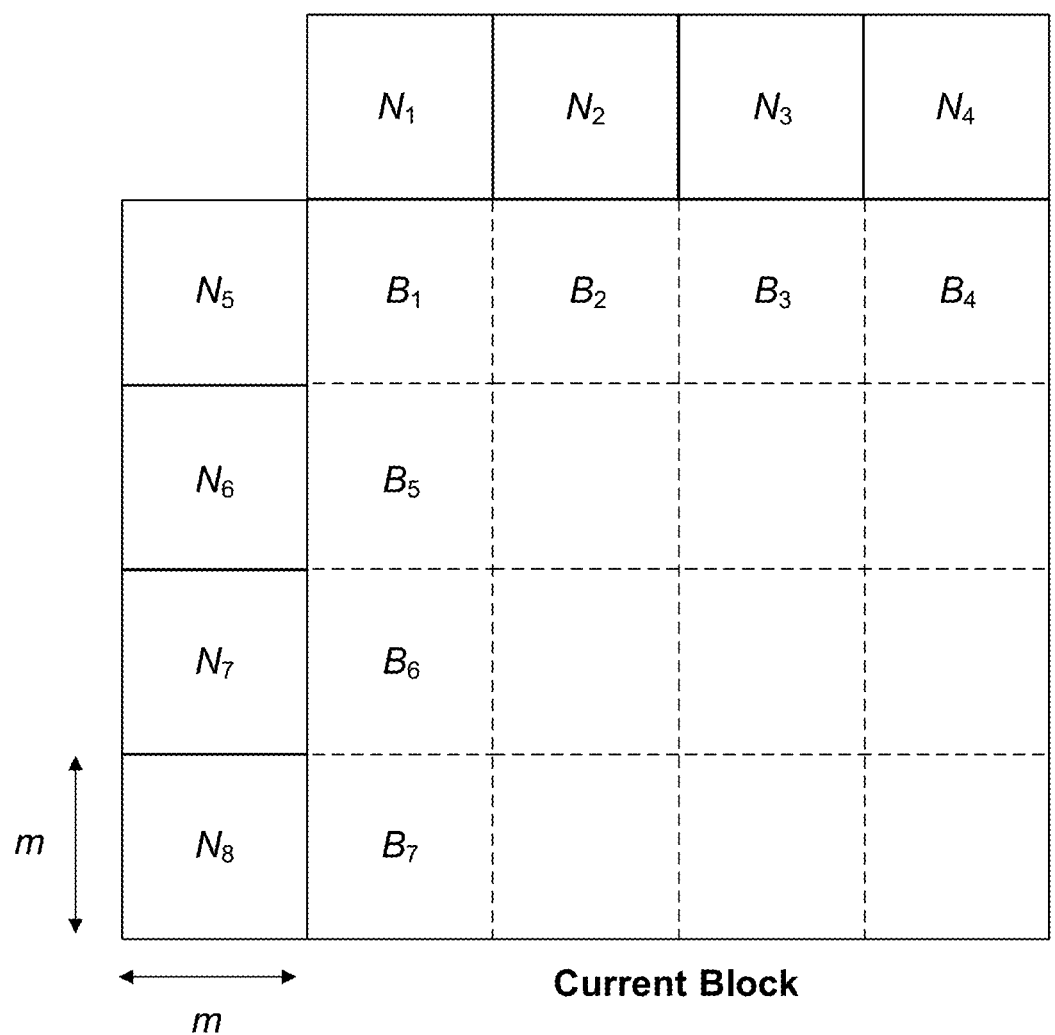
FIG. 14 is a schematic illustration of an example of overlapped block motion compensation (OBMC), where m is the basic processing unit for performing OBMC, N1 to N8 are sub-blocks in the causal neighborhood, and B1 to B7 are sub-blocks in the current block.

Overlapped block motion compensation (OBMC) is a method for providing a prediction of a sample's intensity value based on motion-compensated signals derived from this sample's own motion vectors and those in its causal neighborhood. In exemplary embodiments of GBi, weight values may also be considered in motion compensation for OBMC. An example is demonstrated in FIG. 14 in which the sub-block Bi in the current block has three motion compensated prediction blocks, each of which is formed by using the motion information and weight values from blocks $N_1$, $N_5$ or $B_1$ itself, and the resulting prediction signal of $B_1$ may be a weighted average of the three.

Frame-Rate Up Conversion.

In some embodiments, GBi may operate together with frame-rate up conversion (FRUC). Two different modes may be used for FRUC. A bi-prediction mode may be used if the current picture falls between the first reference picture in L0 and the first reference picture in L1. A uni-prediction mode may be used if the first reference picture in L0 and the first reference picture in L1 are both forward reference pictures or backward reference pictures. The bi-prediction case in FRUC is discussed in detail below. In JEM, equal weight (that is, 0.5) is used for FRUC bi-prediction. While the quality of two predictors in FRUC bi-prediction may differ, combining the two predictors with unequal prediction quality using the equal weight may be sub-optimal. The use of GBi can improve the final bi-prediction quality due to the use of unequal weights. In an exemplary embodiment, the weight value of GBi is derived for blocks coded with FRUC bi-prediction and thus need not be signaled. Each weight value in $W_L1$ is evaluated independently for each of the 4×4 sub-blocks in a PU with the MV derivation process of FRUC bi-prediction. The weight value that leads the minimal bilateral matching error (that is the sum of the absolute differences between the two uni-directional motion-compensated predictors associated with two reference lists) for a 4×4 block is selected.

Figure 15:
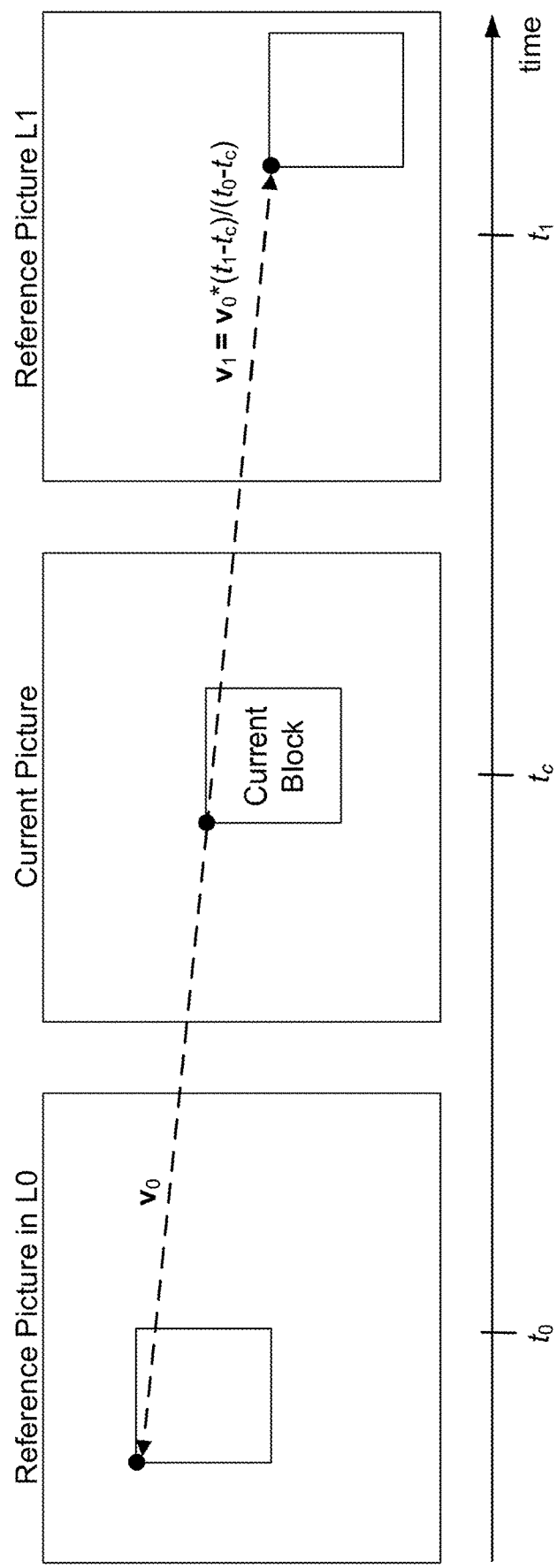
FIG. 15 illustrates an example of frame rate up conversion (FRUC) where $v_0$ is a given motion vector corresponding to reference list L0 and $v_1$ is a scaled MV based on $v_0$ and time distance.

In an exemplary embodiment, FRUC bi-prediction is a decoder-side MV derivation technique which derives MVs by using bilateral matching. For each PU, a list of candidate MVs collected from causal-neighboring blocks is formed. Under the constant motion assumption, each candidate MV is projected linearly onto the first reference picture in the other reference list, where the scaling factor for projection is set proportional to the time distance between the reference picture (e.g. at time $t_0$ or $t_1$) and the current picture ($t_c$). Taking FIG. 15 as an example, where $v_0$ is a candidate MV associated with the reference list L0, $v_1$ is computed as $v_0*(t_1-t_c)/(t_0-t_c)$. Therefore, the bilateral matching error can still be computed for each candidate MV, and an initial MV that reaches minimal bilateral matching error is chosen from the candidate list. Denote this initial MV as $v_0^{INIT}$. Starting from where the initial MV $v_0^{INIT}$ points to, decoder-side motion estimation is performed to find a MV within a pre-defined search range, and the MV that reaches the minimal bilateral matching error is selected as the PU-level MV. Assuming $v_1$ is the projected MV, the optimization process can be formulated as $$\text{argmin}_{v_0} \sum_{x \in PU} \left| (1-0.5)*P_0[x+v_0] - 0.5*P_1\left[x+v_0*\frac{t_1-t_c}{t_0-t_c}\right] \right|. \quad (16)$$

When FRUC bi-prediction is combined with GBi, the search process in Eq. (16) is re-formulated with a weight value w in $W_{L1}$; that is $$\text{argmin}_{v_0} \sum_{x \in PU} \left| (1-w)*P_0[x+v_0] - w*P_1\left[x+v_0*\frac{t_1-t_c}{t_0-t_c}\right] \right|. \quad (17)$$

This PU-level $v_0$ may be further refined independently using the same bilateral matching in Eq. (17) for each 4×4 sub-blocks within a PU, as shown in Eq. (18).

$$\text{argmin}_{v_0} \sum_{x \in 4 \times 4 \, Sub\text{-}block} \left| (1-w)*P_0[x+v_0] - w*P_1\left[x+v_0*\frac{t_1-t_c}{t_0-t_c}\right] \right|. \quad (18)$$

For each of the available weight values w in $W_{L1}$, the equation (18) may be evaluated, and the weight value that minimizes the bilateral matching error is selected as the optimal weight. At the end of the evaluation process, each 4×4 sub-block in a PU has its own bi-prediction MVs and a weight value for performing the generalized bi-prediction. The complexity of such an exhaustive search method may be high, as the weights and the motion vectors are searched in a joint manner. In another embodiment, the search for optimal motion vector and the optimal weight may be conducted in two steps. In the first step, the motion vectors for each 4×4 block may be obtained using Eq. (18), by setting w to an initial value, for example w=0.5. In the second step, the optimal weight may be searched given the optimal motion vector.

In yet another embodiment, to improve motion search accuracy, three steps may be applied. In the first step, an initial weight is searched using the initial motion vector $v_0^{INIT}$. Denote this initial optimal weight as $w^{INIT}$. In the second step, the motion vectors for each 4×4 block may be obtained using Eq. (18), by setting w to $w^{INIT}$. In the third step, the final optimal weight may be searched given the optimal motion vector.

From Eq. (17) and (18), the target is to minimize the difference between two weighted predictors associated respectively with the two reference lists. Negative weights may not be proper for this purpose. In one embodiment, the FRUC-based GBi mode will only evaluate weight values greater than zero. In order to reduce the complexity, the calculation of the sum of absolute differences may be performed using partial samples within each sub-block. For example, the sum of absolute differences may be calculated using only samples locating at even-numbered rows and columns (or, alternatively odd-numbered rows and columns).

GBi Prediction Search Strategy.

Initial Reference List for Bi-Prediction Search.

Methods are described below for improving the prediction performance of GBi by determining which of the two reference lists should be searched first in the motion estimation (ME) stage of bi-prediction. As with conventional bi-prediction, there are two motion vectors associated respectively with reference list L0 and reference list L1 to be determined for minimizing the ME-stage cost; that is:

$$\text{Cost}(t_i, u_j) = \Sigma_x |I[x] - P[x]| + \lambda^* \text{Bits}(t_i, u_j, \text{weight index}), \quad (19)$$

where I[x] is the original signal of a sample x located at x in the current picture, P[x] is the prediction signal of GBi, $t_i$ and $u_j$ are motion vectors pointing respectively to the i-th reference picture in L0 and j-th reference picture in L1, $\lambda$ is a Lagrangian parameter used in the ME stage, and the Bits(•) function estimates the number of bits for encoding the input variables. Each of the Eqs. (3), (8), (13) and (14) can be applied to substitute for P[x] in Eq. (19). For simplicity of explanation, consider Eq. (3) as an example for the following process. Therefore, the cost function in Eq. (19) can be re-written as:

$$\text{Cost}(t_i, u_j) = \Sigma_x |I[x] - (1-w_1)^* P_0[x+t_i] - w_1^* P_1[x+u_j]| + \lambda^* \text{Bits}(t_i, u_j, \text{weight index}). \quad (20)$$

Since there are two parameters ($t_i$ and $u_1$) to be determined, an iterative procedure may be employed. A first such procedure may proceed as follows:
1. Optimize $t_i$, $\forall i$, with the best motion in $\{u_j | \forall j\}$,
2. Optimize $u_j$, $\forall j$, with the best motion in $\{u_i | \forall i\}$,
3. Repeat steps 1. and 2. until either $t_i$ and $u_j$ are not changed or a maximal number of iterations is reached.

A second exemplary iterative procedure may proceed as follows:
1. Optimize $u_j$, $\forall j$, with the best motion in $\{u_i | \forall i\}$,
2. Optimize $t_i$, $\forall i$, with the best motion in $\{u_j | \forall j\}$,
3. Repeat steps 1. and 2. until either $u_j$ and $t_i$ are not changed or the maximal number of iterations is reached.

Which iteration procedure is chosen may depend solely on the ME-stage cost of $t_i$ and $u_j$; that is:

$$c = \begin{cases} 1st, & \text{if } \min\{\text{Cost}(t_i), \forall i\} \geq \min\{\text{Cost}(u_j), \forall j\}; \\ 2nd, & \text{otherwise} \end{cases} \quad (21)$$

where the ME-stage cost function may be the following:

$$\text{Cost}(t_i) = \Sigma_x |I[x] - P_0[x+t_i]| + \lambda^* \text{Bits}(t_i). \quad (22)$$

$$\text{Cost}(u_j) = \Sigma_x |I[x] - P_1[x+u_j]| + \lambda^* \text{Bits}(u_j). \quad (23)$$

However, this initialization process may not be optimal in the cases when $1-w_1$ and $w_1$ are unequal. A typical example that one of the weight values is extremely close to 0, e.g. $w_1 = \lim_{w \to 0} w$, and the ME-stage cost of its associated motion happens to be lower than the other. In this case, the Eq. (20) degenerates to $$\text{Cost}(t_i, u_j) = \Sigma_x |I[x] - P_0[x+t_i]| + \lambda^* \text{Bits}(t_i, u_j, \text{weight index}). \quad (24)$$

The spent overhead for $u_j$ contributes nothing to the prediction signal, resulting in a poor search result for GBi. In this disclosure, the magnitude of the weight values is used instead of Eq. (21); that is $$c = \begin{cases} \text{Eq. (21),} & \text{if } 1 - w_1 = w_1; \\ 1st, & \text{if } 1 - w_1 < w_1; \\ 2nd, & \text{otherwise} \end{cases} \quad (25)$$

Binary Search for Weight Index.

As the number of weight values to be evaluated could introduce extra complexity to the encoder, exemplary embodiments employ a binary search method to prune less-probable weight values at an early stage of encoding. In one such search method, the conventional uni-prediction (associated with 0 and 1 weights) and bi-prediction (associated with 0.5 weight) are performed at the very beginning, and the weight values in $W_{L1}$ may be classified into 4 groups, that is, $A=[w_{min}, 0]$, $B=[0, 0.5]$, $C=[0.5, 1]$ and $D=[1, w_{max}]$. The $w_{min}$ and $w_{max}$ represents the minimal and maximal weight values in $W_{L1}$, respectively, and without loss of generality it is assumed that $w_{min}<0$ and $w_{max}>1$. The following rule may be applied for determining the range of probable weight values.

If w=0 gives better ME-stage cost than w=1, the following rules apply:
  If w=0.5 gives better ME-stage cost than w=0 and w=1, then a weight set $W^{(0)}$ is formed based on the weight values in B.
  Otherwise, $W^{(0)}$ is formed based on the weight values in A.
Otherwise (if w=1 gives better ME-stage cost than w=0), the following rules apply:
  If w=0.5 gives better ME-stage cost than w=0 and w=1, $W^{(0)}$ is formed based on the weight values in C.
  Otherwise, $W^{(0)}$ is formed based on the weight values in D.

After $W^{(0)}$ is formed, the value of $w_{min}$ and $w_{max}$ may be reset according to the minimal and maximal values in $W^{(0)}$, respectively. The ME-stage cost of $w_{min}$ in A and $w_{max}$ in D may be computed if $W^{(0)}$ is associated with A and D, respectively.

The iteration process may operate to keep updating $W^{(k)}$ until more than two weight values remain in the set at k-th iteration. Supposing the process is at the k-th iteration, the iteration process may be specified as follows:
1. Perform GBi with $w_{middle}$ that is the closest weight value to $(w_{min}+w_{max})/2$.
2. If $w_{middle}$ gives better ME-stage cost than $w_{min}$ and $w_{max}$, a recursive process is invoked for $W^{(k+1)}$ to test both $[w_{min}, w_{middle}]$ and $[w_{middle}, w_{max}]$ independently, and the iteration process jumps to step 6.
3. Otherwise if $w_{middle}$ gives worse ME-stage cost than $w_{min}$ and $w_{max}$, the iteration process terminates.
4. Otherwise if $w_{min}$ gives better ME-stage cost than $w_{max}$, then $W^{(k+1)}$ is formed based on the weight values in $[w_{min}, w_{middle}]$ and the iteration process jumps to step 6.
5. Otherwise (if $w_{min}$ gives worse ME-stage cost than $w_{max}$), then $W^{(k+1)}$ is formed based on the weight values in $[w_{middle}, w_{max}]$ and the iteration process jumps to step 6.
6. If the number of weight value remains in $W^{(k+1)}$ is more than 2, $w_{min}$ and $w_{max}$ are reset according to the minimal and maximal values in $W^{(k+1)}$ and the iteration process returns to step 1; otherwise, the iteration process terminates.

After the iteration process stops, the weight value that achieves the lowest ME-stage cost among all test values may be chosen for performing the generalized bi-prediction.

Weight Value Estimation for Non-2N×2N Partitions.

In some embodiments, after testing each weight value for 2N×2N partition, the best performing weight values other than 0, 0.5 and 1 can serve as estimates for the optimal weight value of non-2N×2N partitions. In some embodiments, supposing there are n unique estimates, only the weight values equal to 0, 0.5, 1, and the n estimates are evaluated for non-2N×2N partitions.

Partition Size Estimation for Non-2N×2N Partitions.

In some embodiments, not all of the non-2N×2N partitions are tested by an exemplary video encoder. Non-2N×2N partitions can be classified to two sub-categories: symmetric motion partitions (SMP) with 2N×N and N×2N partition types and asymmetric motion partitions (AMP) with 2N×nU, 2N×nD, nL×2N and nR×2N partition types. If the rate-distortion (R-D) cost for partitions in SMP is smaller than that of 2N×2N, then some of the partition types in AMP will be evaluated at the encoder. The decision of which partition types in AMP to test may depend on which of the 2N×N and N×2N demonstrates better performance, in terms of the R-D cost. If the rate-distortion cost of 2N×N is smaller, then partition types, 2N×nU and 2N×nD, may be checked further; otherwise (if the cost of N×2N is smaller), then partition types, nL×2N and nR×2N, may be checked further.

Fast Parameter Estimation for Multi-Pass Encoding.

In exemplary embodiments using multi-pass encoders, prediction parameters (such as block motion and weight value) optimized from earlier encoding passes can be adopted as initial parameter estimation at succeeding encoding passes. In such encoders, coding blocks partitioned from pictures may be predicted and encoded twice or even more, resulting in a considerable increase of encoding complexity. One technique for reducing this complexity is to buffer the optimized prediction parameters from the initial encoding pass and take them as the initial parameter estimation for further refinement in following encoding passes. For example, if an inter prediction mode happens to be the best mode at the initial pass, the encoder evaluates only inter prediction modes at the rest of encoding passes. In some embodiments, buffering is performed for prediction parameters relating to GBi, such as the selection of weight value in $W_{L1}$, the bi-prediction MVs associated with the selected weight value, IC flag, OBMC flag, Integer Motion Vector (IMV) flag and coded block flag (CBF). In such embodiments, the values of these buffered parameters can be reused or refined at the following encoding pass. In particular, when the aforementioned bi-prediction MVs are taken, these MVs can serve as an initial search position for bi-prediction search. Then, they will be refined in the motion estimation stage and, later on, taken as the initial search position for the next encoding pass.

Exemplary Bitstream Communication Framework.

Figure 16:
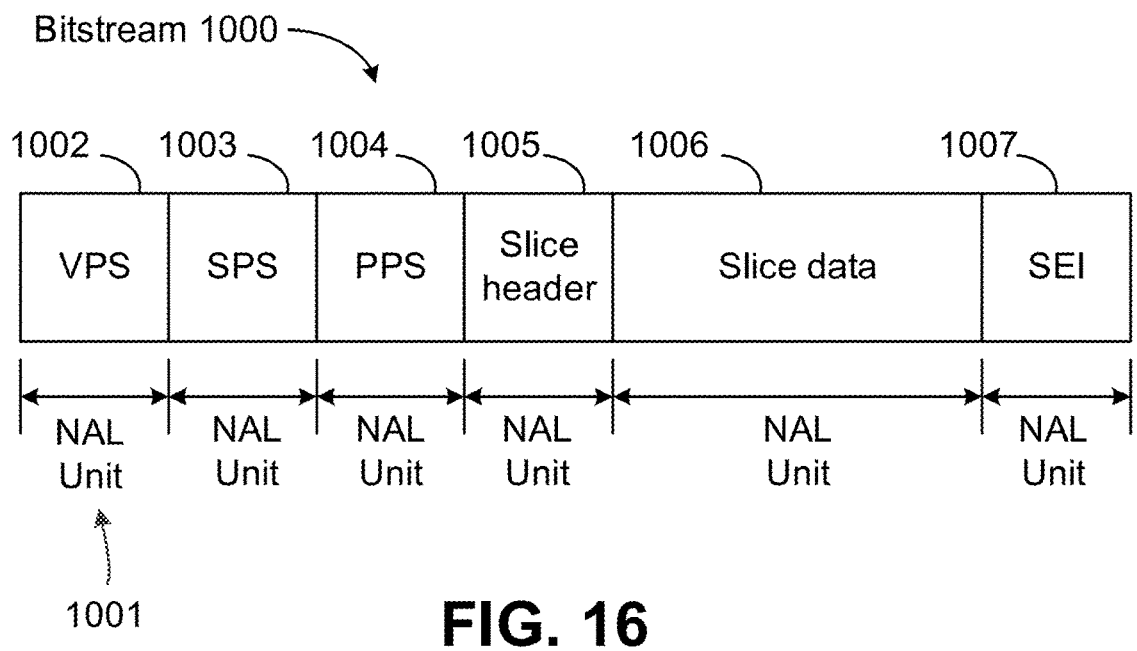
FIG. 16 is a diagram illustrating an example of a coded bitstream structure.

FIG. 16 is a schematic diagram illustrating an example of a coded bitstream structure. A coded bitstream 1000 consists of a number of NAL (Network Abstraction layer) units 1001. A NAL unit may contain coded sample data such as coded slice 1006, or high level syntax metadata such as parameter set data, slice header data 1005 or supplemental enhancement information data 1007 (which may be referred to as an SEI message). Parameter sets are high level syntax structures containing essential syntax elements that may apply to multiple bitstream layers (e.g. video parameter set 1002 (VPS)), or may apply to a coded video sequence within one layer (e.g. sequence parameter set 1003 (SPS)), or may apply to a number of coded pictures within one coded video sequence (e.g. picture parameter set 1004 (PPS)). The parameter sets can be either sent together with the coded pictures of the video bit stream, or sent through other means (including out-of-band transmission using reliable channels, hard coding, etc.). Slice header 1005 is also a high level syntax structure that may contain some picture-related information that is relatively small or relevant only for certain slice or picture types. SEI messages 1007 carry the information that may not be needed by the decoding process but can be used for various other purposes such as picture output timing or display as well as loss detection and concealment.

Figure 17:
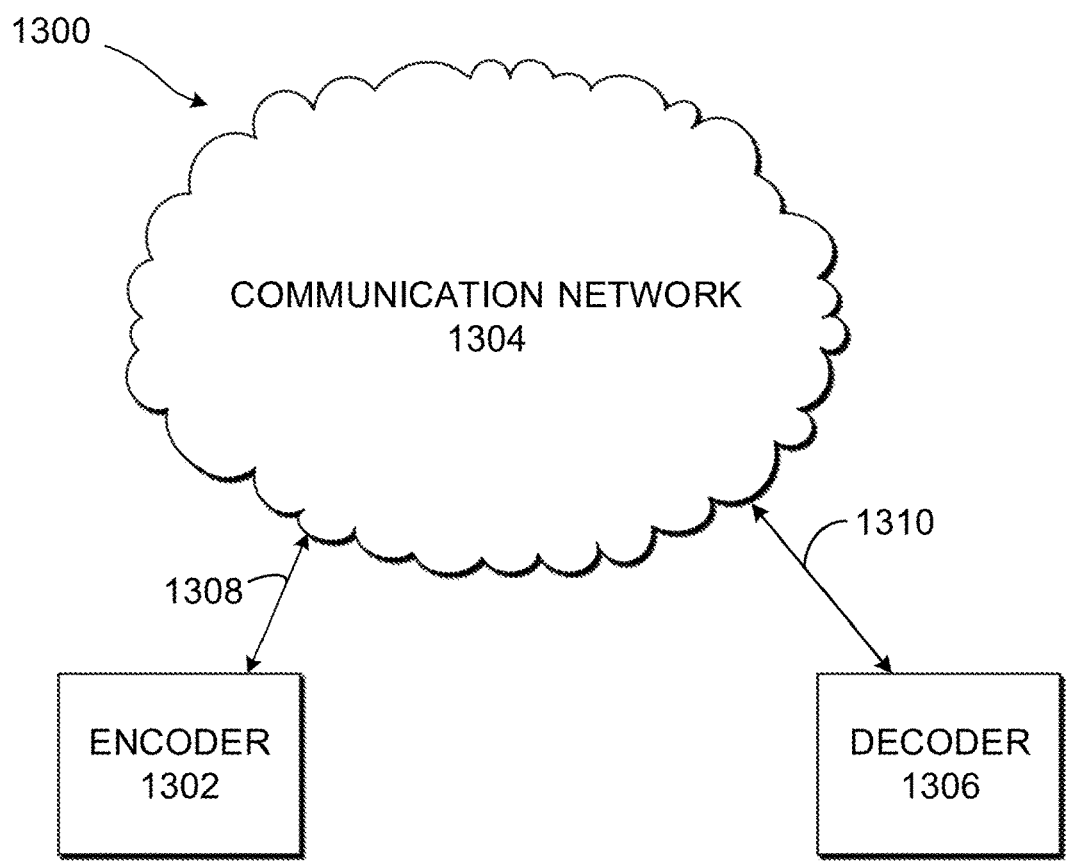
FIG. 17 is a diagram illustrating an example communication system.

FIG. 17 is a schematic diagram illustrating an example of a communication system. The communication system 1300 may comprise an encoder 1302, a communication network 1304, and a decoder 1306. The encoder 1302 may be in communication with the network 1304 via a connection 1308, which may be a wireline connection or a wireless connection. The encoder 1302 may be similar to the block-based video encoder of FIG. 1. The encoder 1302 may include a single layer codec (e.g., FIG. 1) or a multilayer codec. For example, the encoder 1302 may be a multi-layer (e.g., two-layer) scalable coding system with picture-level ILP support. The decoder 1306 may be in communication with the network 1304 via a connection 1310, which may be a wireline connection or a wireless connection. The decoder 1306 may be similar to the block-based video decoder of FIG. 2. The decoder 1306 may include a single layer codec (e.g., FIG. 2) or a multilayer codec. For example, the decoder 1306 may be a multi-layer (e.g., two-layer) scalable decoding system with picture-level ILP support.

The encoder 1302 and/or the decoder 1306 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1304 may be a suitable type of communication network. For example, the communications network 1304 may be a multiple access system that provides content, such as voice, data, video, messaging, broadcast, etc., to multiple wireless users. The communications network 1304 may enable multiple wireless users to access such content through the sharing of system resources, including wireless bandwidth. For example, the communications network 1304 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1304 may include multiple connected communication networks. The communication network 1304 may include the Internet and/or one or more private commercial networks such as cellular networks, WiFi hotspots, Internet Service Provider (ISP) networks, and/or the like.

Figure 18:
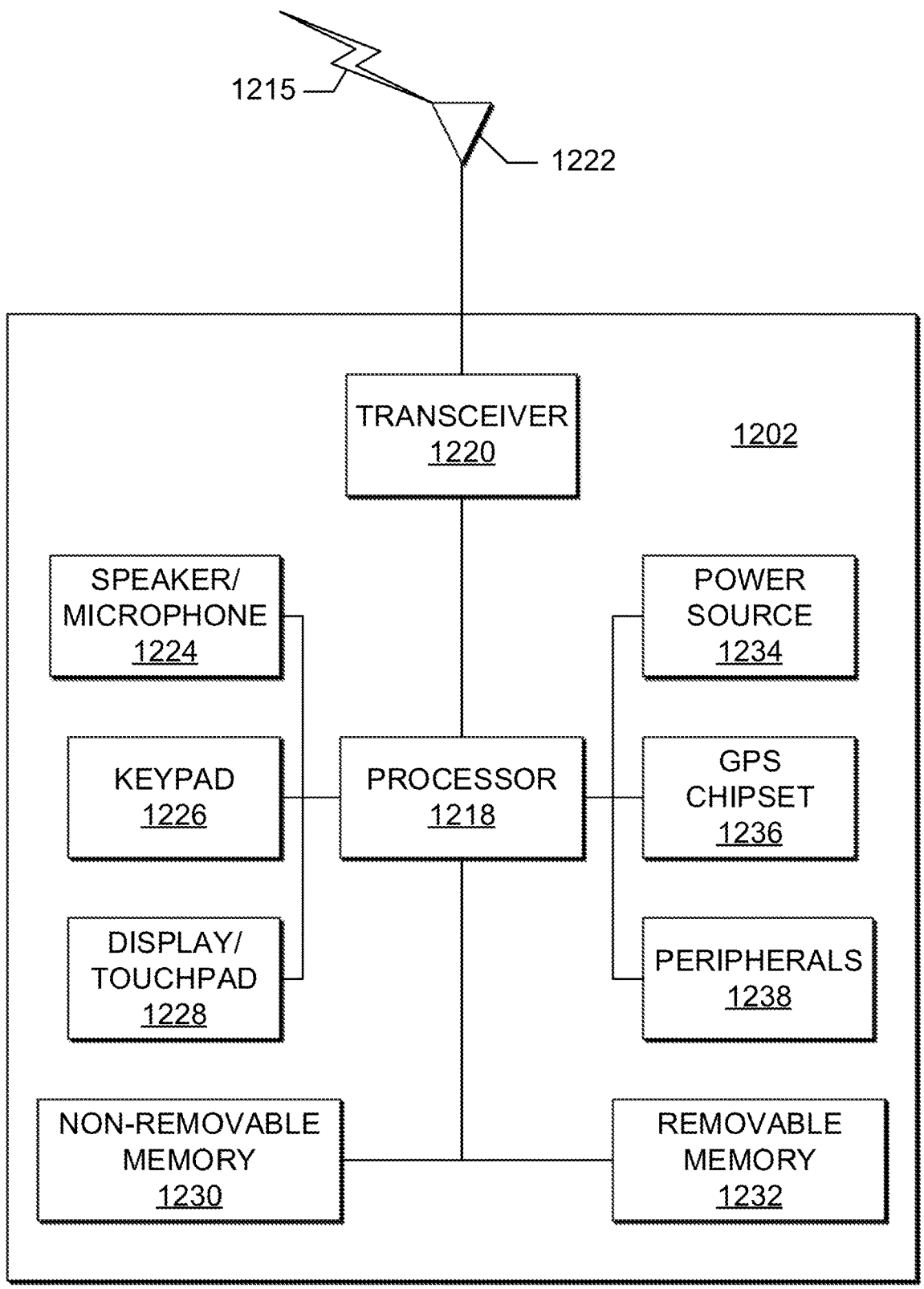
FIG. 18 is a diagram illustrating an example wireless transmit/receive unit (WTRU), which may be used as an encoder or decoder in some embodiments.

FIG. 18 is a system diagram of an example WTRU in which an encoder or decoder as described herein may be implemented. As shown the example WTRU 1202 may include a processor 1218, a transceiver 1220, a transmit/receive element 1222, a speaker/microphone 1224, a keypad or keyboard 1226, a display/touchpad 1228, non-removable memory 1230, removable memory 1232, a power source 1234, a global positioning system (GPS) chipset 1236, and/or other peripherals 1238. It will be appreciated that the WTRU 1202 may include any sub-combination of the foregoing elements while remaining consistent with an embodiment. Further, a terminal in which an encoder (e.g., encoder 100) and/or a decoder (e.g., decoder 200) is incorporated may include some or all of the elements depicted in and described herein with reference to the WTRU 1202 of FIG. 18.

The processor 1218 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1218 may perform signal coding, data processing, power control, input/output processing, and/or any other functionality that enables the WTRU 1500 to operate in a wired and/or wireless environment. The processor 1218 may be coupled to the transceiver 1220, which may be coupled to the transmit/receive element 1222. While FIG. 18 depicts the processor 1218 and the transceiver 1220 as separate components, it will be appreciated that the processor 1218 and the transceiver 1220 may be integrated together in an electronic package and/or chip.

The transmit/receive element 1222 may be configured to transmit signals to, and/or receive signals from, another terminal over an air interface 1215. For example, in one or more embodiments, the transmit/receive element 1222 may be an antenna configured to transmit and/or receive RF signals. In one or more embodiments, the transmit/receive element 1222 may be an emitter/detector configured to transmit and/or receive IR, UV, or visible light signals, for example. In one or more embodiments, the transmit/receive element 1222 may be configured to transmit and/or receive both RF and light signals. It will be appreciated that the transmit/receive element 1222 may be configured to transmit and/or receive any combination of wireless signals.

In addition, although the transmit/receive element 1222 is depicted in FIG. 18 as a single element, the WTRU 1202 may include any number of transmit/receive elements 1222. More specifically, the WTRU 1202 may employ MIMO technology. Thus, in one embodiment, the WTRU 1202 may include two or more transmit/receive elements 1222 (e.g., multiple antennas) for transmitting and receiving wireless signals over the air interface 1215.

The transceiver 1220 may be configured to modulate the signals that are to be transmitted by the transmit/receive element 1222 and/or to demodulate the signals that are received by the transmit/receive element 1222. As noted above, the WTRU 1202 may have multi-mode capabilities. Thus, the transceiver 1220 may include multiple transceivers for enabling the WTRU 1202 to communicate via multiple RATs, such as UTRA and IEEE 802.11, for example.

The processor 1218 of the WTRU 1202 may be coupled to, and may receive user input data from, the speaker/microphone 1224, the keypad 1226, and/or the display/touchpad 1228 (e.g., a liquid crystal display (LCD) display unit or organic light-emitting diode (OLED) display unit). The processor 1218 may also output user data to the speaker/microphone 1224, the keypad 1226, and/or the display/touchpad 1228. In addition, the processor 1218 may access information from, and store data in, any type of suitable memory, such as the non-removable memory 1230 and/or the removable memory 1232. The non-removable memory 1230 may include random-access memory (RAM), read-only memory (ROM), a hard disk, or any other type of memory storage device. The removable memory 1232 may include a subscriber identity module (SIM) card, a memory stick, a secure digital (SD) memory card, and the like. In one or more embodiments, the processor 1218 may access information from, and store data in, memory that is not physically located on the WTRU 1202, such as on a server or a home computer (not shown).

The processor 1218 may receive power from the power source 1234, and may be configured to distribute and/or control the power to the other components in the WTRU 1202. The power source 1234 may be any suitable device for powering the WTRU 1202. For example, the power source 1234 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1218 may be coupled to the GPS chipset 1236, which may be configured to provide location information (e.g., longitude and latitude) regarding the current location of the WTRU 1202. In addition to, or in lieu of, the information from the GPS chipset 1236, the WTRU 1202 may receive location information over the air interface 1215 from a terminal (e.g., a base station) and/or determine its location based on the timing of the signals being received from two or more nearby base stations. It will be appreciated that the WTRU 1202 may acquire location information by way of any suitable location-determination method while remaining consistent with an embodiment.

The processor 1218 may further be coupled to other peripherals 1238, which may include one or more software and/or hardware modules that provide additional features, functionality and/or wired or wireless connectivity. For example, the peripherals 1238 may include an accelerometer, orientation sensors, motion sensors, a proximity sensor, an e-compass, a satellite transceiver, a digital camera and/or video recorder (e.g., for photographs and/or video), a universal serial bus (USB) port, a vibration device, a television transceiver, a hands free headset, a Bluetooth® module, a frequency modulated (FM) radio unit, and software modules such as a digital music player, a media player, a video game player module, an Internet browser, and the like.

By way of example, the WTRU 1202 may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a tablet computer, a personal computer, a wireless sensor, consumer electronics, or any other terminal capable of receiving and processing compressed video communications.

The WTRU 1202 and/or a communication network (e.g., communication network 804) may implement a radio technology such as Universal Mobile Telecommunications System (UMTS) Terrestrial Radio Access (UTRA), which may establish the air interface 1215 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA). The WTRU 1202 and/or a communication network (e.g., communication network 804) may implement a radio technology such as Evolved UMTS Terrestrial Radio Access (E-UTRA), which may establish the air interface 1215 using Long Term Evolution (LTE) and/or LTE-Advanced (LTE-A).

The WTRU 1202 and/or a communication network (e.g., communication network 804) may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like. The WTRU 1500 and/or a communication network (e.g., communication network 804) may implement a radio technology such as IEEE 802.11, IEEE 802.15, or the like.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method of encoding a video comprising:
for at least a current block in a current picture of a video, obtaining at least a first weight from among a predetermined set of no more than five bi-prediction weights;
predicting the current block as a weighted sum of a first reference block in a first reference picture and a second reference block in a second reference picture, wherein the first reference block is weighted by the first weight and the second block is weighted by a second weight; and
encoding in a bitstream block-level information identifying at least the first weight in the set of bi-prediction weights using a truncated unary code, wherein the truncated unary code assigns a codeword to each of the weights in the predetermined set of bi-prediction weights, and wherein the predetermined set of bi-prediction weights, arranged in order of increasing codeword length, comprises a first set of weights in ascending order interleaved with a second set of weights in descending order.

2. An apparatus for decoding a video comprising a processor configured to perform at least:
for at least a current block in a current picture of a video, decoding from a bitstream block-level information identifying at least a first weight from among a predetermined set of no more than five bi-prediction weights using a truncated unary code, wherein the truncated unary code assigns a codeword to each of the weights in the predetermined set of bi-prediction weights, and wherein the predetermined set of bi-prediction weights, arranged in order of increasing codeword length, comprises a first set of weights in ascending order interleaved with a second set of weights in descending order; and
predicting the current block as a weighted sum of a first reference block in a first reference picture and a second reference block in a second reference picture, wherein the first reference block is weighted by the first weight and the second block is weighted by a second weight.

3. A method for decoding a video comprising:
for at least a current block in a current picture of a video, decoding from a bitstream block-level information identifying at least a first weight from among a predetermined set of no more than five bi-prediction weights using a truncated unary code, wherein the truncated unary code assigns a codeword to each of the weights in the predetermined set of bi-prediction weights, and wherein the predetermined set of bi-prediction weights, arranged in order of increasing codeword length, comprises a first set of weights in ascending order interleaved with a second set of weights in descending order; and predicting the current block as a weighted sum of a first reference block in a first reference picture and a second reference block in a second reference picture, wherein the first reference block is weighted by the first weight and the second block is weighted by a second weight.

4. The method of claim 3, wherein the second weight is derived from the first weight.

5. The method of claim 3, wherein predicting the current block is performed using affine prediction.

6. The method of claim 3, wherein the decoding comprises entropy decoding of a truncated unary code binarization of the first weight.

7. The method of claim 3, further comprising:
for at least a subsequently-coded block in the current picture, decoding from the bitstream information identifying the current block as a selected merge candidate; and
predicting the subsequently-coded block with weighted bi-prediction using at least the first weight.

8. The apparatus of claim 2, wherein the second weight is derived from the first weight.

9. The apparatus of claim 2, wherein predicting the current block is performed using affine prediction.

10. The apparatus of claim 2, wherein the decoding comprises entropy decoding of a truncated unary code binarization of the first weight.

11. The apparatus of claim 2, wherein the processor is further configured to perform:
for at least a subsequently-coded block in the current picture, decoding from the bitstream information identifying the current block as a selected merge candidate; and
predicting the subsequently-coded block with weighted bi-prediction using at least the first weight.

12. The method of claim 1, wherein predicting the current block is performed using affine prediction.

13. The method of claim 1, wherein the encoding comprises entropy encoding of a truncated unary code binarization of the first weight.

14. An apparatus for encoding a video comprising a processor configured to perform at least:
for at least a current block in a current picture of a video, obtaining at least a first weight from among a predetermined set of no more than five bi-prediction weights;
predicting the current block as a weighted sum of a first reference block in a first reference picture and a second reference block in a second reference picture, wherein the first reference block is weighted by the first weight and the second block is weighted by a second weight; and
encoding in a bitstream block-level information identifying at least the first weight in the set of bi-prediction weights using a truncated unary code, wherein the truncated unary code assigns a codeword to each of the weights in the predetermined set of bi-prediction weights, and wherein the predetermined set of bi-prediction weights, arranged in order of increasing codeword length, comprises a first set of weights in ascending order interleaved with a second set of weights in descending order.

15. The apparatus of claim 14, wherein predicting the current block is performed using affine prediction.

16. The apparatus of claim 14, wherein the encoding comprises entropy encoding of a truncated unary code binarization of the first weight.

17. The method of claim 1, wherein the predetermined set of bi-prediction weights is a set of five bi-prediction weights.

18. The apparatus of claim 2, wherein the predetermined set of bi-prediction weights is a set of five bi-prediction weights.

19. The method of claim 3, wherein the predetermined set of bi-prediction weights is a set of five bi-prediction weights.

20. The apparatus of claim 14, wherein the predetermined set of bi-prediction weights is a set of five bi-prediction weights.

* * * * *